(12) United States Patent
Gray et al.

(10) Patent No.: US 11,983,673 B2
(45) Date of Patent: *May 14, 2024

(54) DATA ANALYTICS SYSTEM TO AUTOMATICALLY RECOMMEND RISK MITIGATION STRATEGIES FOR AN ENTERPRISE

(71) Applicant: Hartford Fire Insurance Company, Hartford, CT (US)

(72) Inventors: Willie F Gray, North Granby, CT (US); Donato L Monaco, Cromwell, CT (US); Jennifer Day, Versailles, KY (US); Andrew D. Preece, Winter Garden, FL (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,054

(22) Filed: Jun. 5, 2023

(65) Prior Publication Data
US 2023/0325780 A1      Oct. 12, 2023

Related U.S. Application Data

(63) Continuation of application No. 17/847,339, filed on Jun. 23, 2022, now Pat. No. 11,710,101, which is a continuation of application No. 17/061,919, filed on Oct. 2, 2020, now Pat. No. 11,403,599.

(Continued)

(51) Int. Cl.
*G06Q 40/00* (2023.01)
*G06F 16/2458* (2019.01)
(Continued)

(52) U.S. Cl.
CPC ..... *G06Q 10/1057* (2013.01); *G06F 16/2465* (2019.01); *G06Q 10/06375* (2013.01); *G06Q 40/08* (2013.01); *G06F 2216/03* (2013.01)

(58) Field of Classification Search
CPC ......... G06Q 10/1057; G06Q 10/06375; G06Q 40/08; G06F 16/2465; G06F 2216/03
(Continued)

(56) References Cited

U.S. PATENT DOCUMENTS 6,023,578 A * 2/2000 Birsan ...................... G06F 8/10
717/108
7,003,482 B1 * 2/2006 Margoscin ............ G06Q 40/00
717/136

(Continued)

OTHER PUBLICATIONS

Going Digital: A Survey on Digitalization and Large-Scale Data Analytics in Healthcare; Proceedings of the IEEE (vol. 104, Issue: 11, pp. 2180-2206); Volker Tresp, J. Marc Overhage, Markus Bundschus, Shahrooz Rabizadeh, Peter A. Fasching, Shipeng Yu, Oct. 19, 2016. (Year: 2016).*

(Continued)

*Primary Examiner* — Tien C Nguyen
(74) *Attorney, Agent, or Firm* — Buckley, Maschoff & Talwalkar LLC

(57) ABSTRACT

A data analytics system may include a first risk relationship data store containing electronic records that represent a plurality of risk relationships between the enterprise and a first risk relationship provider. Similarly, a second risk relationship data store containing electronic records that represent a plurality of risk relationships between the enterprise and a second risk relationship provider. A back-end application computer server may include a data mining engine that analyzes a set of electronic records in the first and second risk relationship data stores to identify flags corresponding to risk drivers. A predictive analytics engine may then calculate a risk score associated with the set of electronic records based on the associated entity attribute values and the identified flags corresponding to risk drivers. An insight platform may automatically generate a recom- (Continued)

mended action for the enterprise to lower the calculated risk score.

21 Claims, 15 Drawing Sheets

Related U.S. Application Data

(60) Provisional application No. 62/923,759, filed on Oct. 21, 2019.

(51) Int. Cl.
*G06Q 10/0637* (2023.01)
*G06Q 10/1057* (2023.01)
*G06Q 40/08* (2012.01)

(58) Field of Classification Search
USPC ...... 705/4, 5, 2, 39, 37, 38, 40, 45, 50, 310, 705/1.1, 64, 7.28; 715/205; 235/492, 235/379, 380, 462.46; 340/5.74
See application file for complete search history.

(56) References Cited

U.S. PATENT DOCUMENTS

| | | | | |
|---|---|---|---|---|
| 7,856,617 B2 * | 12/2010 | Szlam | ................... | G06Q 40/08 717/110 |
| 8,065,168 B2 * | 11/2011 | Szlam | ................... | G06Q 10/06 717/109 |
| 8,453,138 B2 * | 5/2013 | Meller | ................... | G06F 8/658 717/169 |
| 8,478,769 B2 * | 7/2013 | Goldfarb | ................ | G06Q 10/10 707/758 |
| 8,904,349 B2 * | 12/2014 | Hudson, Jr. | ............... | G06F 8/38 717/116 |
| 2003/0158760 A1 * | 8/2003 | Kannenberg | ........... | G06Q 40/08 717/140 |
| 2004/0103124 A1 * | 5/2004 | Kupkova | ................ | G06F 16/93 707/999.203 |
| 2006/0010032 A1 * | 1/2006 | Eicher | ................ | G06Q 10/0635 705/7.38 |
| 2007/0150319 A1 * | 6/2007 | Menendez | ............. | G06Q 40/00 707/999.104 |
| 2008/0235064 A1 * | 9/2008 | Gulko | ............... | H01L 21/28035 257/E21.133 |
| 2011/0072416 A1 * | 3/2011 | Hudson, Jr. | ............... | G06F 8/38 717/122 |
| 2013/0151631 A1 * | 6/2013 | Jensen | ................... | H04L 51/18 709/206 |

OTHER PUBLICATIONS

Deep analytics for workplace risk and disaster management; IBM Journal of Research and Development (vol. 64, Issue: 1/2, pp. 14:1-14:9); S. Dalal, D. Bassu; Oct. 11, 2019. (Year: 2019).*

* cited by examiner

DATA ANALYTICS SYSTEM TO AUTOMATICALLY RECOMMEND RISK MITIGATION STRATEGIES FOR AN ENTERPRISE

CROSS-REFERENCE TO RELATED APPLICATIONS

The present application is a continuation of U.S. patent application Ser. No. 17/847,339 entitled "DATA ANALYTICS SYSTEM TO AUTOMATICALLY RECOMMEND RISK MITIGATION STRATEGIES FOR AN ENTERPRISE" and filed on Jun. 23, 2022, which was a continuation of U.S. patent application Ser. No. 17/061,919 entitled "DATA ANALYTICS SYSTEM TO AUTOMATICALLY RECOMMEND RISK MITIGATION STRATEGIES FOR AN ENTERPRISE" and filed on Oct. 2, 2020 which claimed priority to U.S. Patent Application No. 62/923,759 entitled "DATA ANALYTICS SYSTEM TO AUTOMATICALLY RECOMMEND RISK MITIGATION STRATEGIES FOR AN ENTERPRISE" and filed on Oct. 21, 2019. The entire contents of those applications are incorporated herein by reference.

TECHNICAL FIELD

The present application generally relates to computer systems and more particularly to computer systems that are adapted to mine data to identify risk drivers and to develop risk mitigation strategies.

BACKGROUND

Electronic insurance claim records may be stored and utilized by an enterprise, such as an insurance company. For example, an insurance company may be interested in analyzing information about risk drivers and insurance claim outcomes in each insurance claim record to model insurance claim outcomes based on different risk drivers. In some cases, the insurance company might want to advise customers how different identified risk drivers affect insurance claim outcomes and advise customers on adopting risk mitigation strategies for affecting insurance claim outcomes. Accordingly, the insurance company may add value to insurance products sold to customers by helping customers identify risk drivers that are affecting their insurance claim outcomes and their insurance costs. Further, the insurance company may add value to insurance products sold to customers by helping customers employ risk mitigation strategies that improve their insurance claim outcomes and reduce their insurance costs. Human analysis of electronic records to identify risk drivers, however, can be a time consuming, error prone and subjective process—especially where there are a substantial number of records to be analyzed (e.g., thousands of electronic records might need to be reviewed) and/or there are a lot of factors that could potentially influence insurance claim outcomes. In addition, this type of information may be spread throughout a number of different computer systems (e.g., associated with different insurance companies, a human resources department, etc.).

It would be desirable to provide systems and methods for mining data to identify risk factors and for developing risk mitigation strategies in a way that provides fast and accurate results.

SUMMARY OF THE INVENTION

According to some embodiments, systems, methods, apparatus, computer program code and means are provided for mining data to identify risk factors and for developing risk mitigation strategies in a way that provides fast and accurate results and that allow for flexibility and effectiveness when responding to those results.

The present application is directed to systems and methods adapted to automatically analyze insurance claim records, automatically identify risk drivers, automatically identify how these risk drivers affect insurance claim outcomes and automatically provide risk mitigation strategies that improve insurance claim outcomes.

In one embodiment of the present application, a data analytics system includes a data mining engine, a predictive analytics engine and a claims insight platform. The data mining engine analyzes a plurality of insurance claim files to identify flags corresponding to risk drivers. The predictive analytics engine calculates a risk score for each of the plurality of insurance claim files based on identified flags corresponding to risk drivers. The claims insight platform selects a subset of the plurality of insurance claim files, calculates an average risk score for the subset of the plurality of insurance claim files, and determines an expected claim outcome based on the calculated average risk score for the subset of the plurality of insurance claim files.

In some embodiments, a data analytics system may include a first risk relationship data store containing electronic records that represent a plurality of risk relationships between the enterprise and a first risk relationship provider. Similarly, a second risk relationship data store containing electronic records that represent a plurality of risk relationships between the enterprise and a second risk relationship provider. A back-end application computer server may include a data mining engine that analyzes a set of electronic records in the first and second risk relationship data stores to identify flags corresponding to risk drivers. A predictive analytics engine may then calculate a risk score associated with the set of electronic records based on the associated entity attribute values and the identified flags corresponding to risk drivers. An insight platform may automatically generate a recommended action for the enterprise to lower the calculated risk score.

Some embodiments comprise: means for analyzing, by a data mining engine of the back-end application computer server, a set of electronic records in a first and a second risk relationship data store to identify flags corresponding to risk drivers, wherein the first risk relationship data store contains electronic records that represent a plurality of risk relationships between the enterprise and a first risk relationship provider, and the second risk relationship data store contains electronic records that represent a plurality of risk relationships between the enterprise and a second risk relationship provider; means for calculating, by a predictive analytics engine of the back-end application computer server, a risk score associated with the set of electronic records based on associated entity attribute values and the identified flags corresponding to risk drivers; and means for automatically generating, by an insight platform of the back-end application computer server, a recommended action for the enterprise to lower the calculated risk score.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way of mining data to identify risk factors and for developing risk mitigation strategies in a way that provides fast and accurate results. With these and other advantages and features that will become hereinafter apparent, a more complete understanding of the nature of the invention can be obtained by referring to the following detailed description and to the drawings appended hereto.

DETAILED DESCRIPTION

Figure 1:
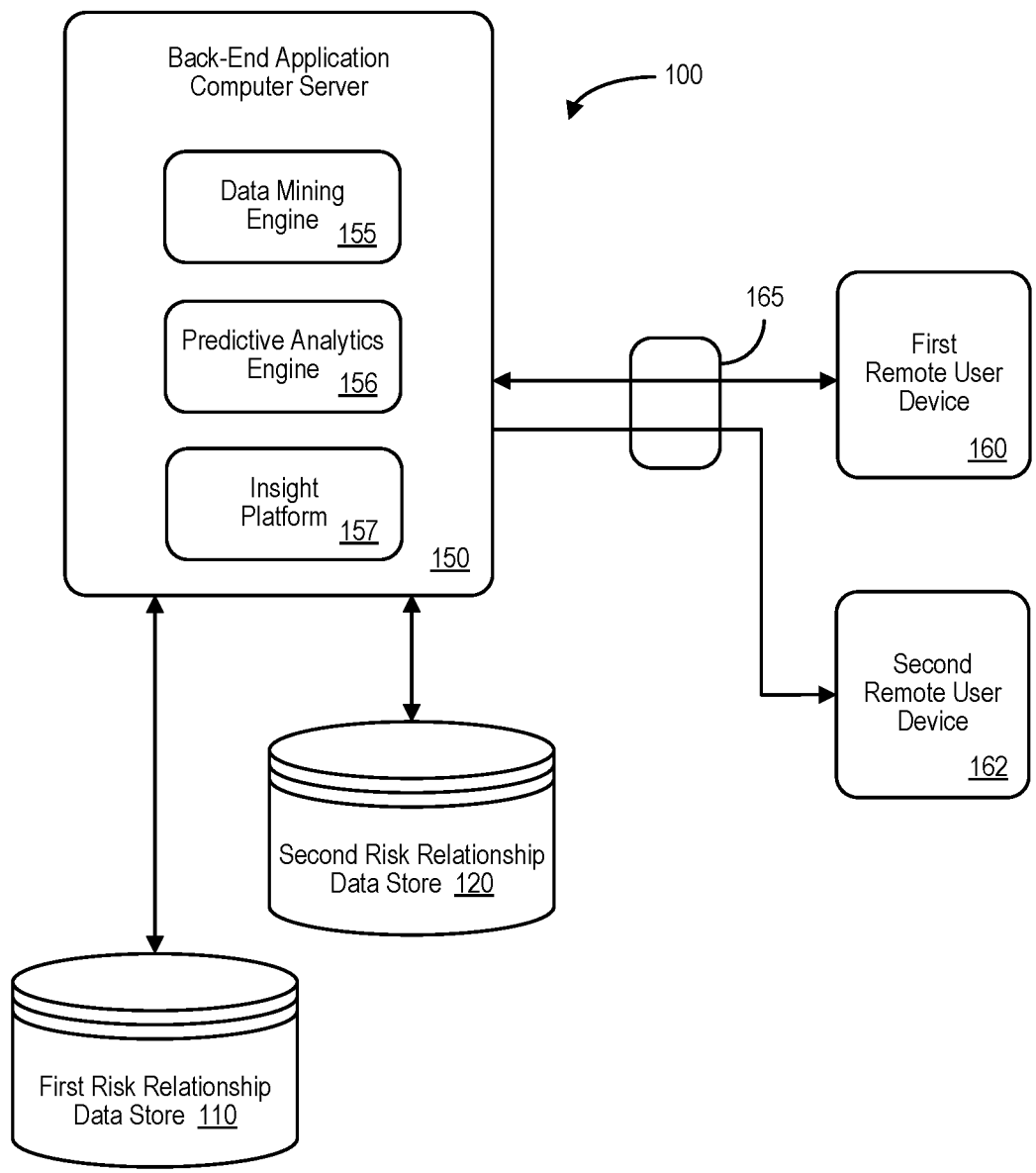
FIG. 1 is a high-level block diagram of a system in accordance with some embodiments.

Before the various exemplary embodiments are described in further detail, it is to be understood that the present invention is not limited to the particular embodiments described. It is also to be understood that the terminology used herein is for the purpose of describing particular embodiments only, and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data analytics. The present invention is directed to more than merely a computer implementation of a routine or conventional activity previously known in the industry as it provides a specific advancement in the area of electronic record analysis by providing improvements in data leveraging to identify risk factors, identify the effect of these risk factors on outcomes, and identify risk mitigation strategies to improve outcomes. The present invention provides improvement beyond a mere generic computer implementation as it involves the novel ordered combination of system elements and processes to provide improvements in data leveraging to identify risk factors, identify the effect of these risk factors on outcomes, and identify risk mitigation strategies to improve outcomes. The present invention is directed to a claims insight factory adapted to automatically analyze insurance claim records, automatically identify risk drivers, automatically identify how these risk drivers affect insurance claim outcomes and automatically provide risk mitigation strategies that improve insurance claim outcomes. In addition, in the present invention information may be accessed, updated (e.g., with tags or other annotations), and analyzed via a back-end application server to accurately improve the exchange of information, thus improving the overall efficiency of the system associated with message storage requirements and/or bandwidth considerations (e.g., by reducing the number of messages that need to be transmitted via a network). Moreover, embodiments associated with accessing and updating accurate, pertinent information might further improve sales of risk relationships, allocations of resources, electronic record processing decisions, etc.

In the context of the present application, customer refers to an employer who purchases insurance coverage from an insurance company on behalf of its employees (i.e., the insured), the insurance company refers to the insurer that provides insurance coverage to the insured, and the claimant refers to an injured party who files an insurance claim. Further, in the context of the present application, risk factors refer to categories of risk that may affect the outcomes of insurance claims, including, e.g., social risk, psychological risk, biological risk, etc. Each of these risk factors (i.e., risk categories) includes specific risk drivers. For example, the risk drivers for social risk may include, e.g., employee skills, employer environment, employee satisfaction, etc.; risk drivers for psychological risk may include, e.g., depression, Post Traumatic Stress Disorder ("PTSD"), etc.; risk drivers for biological risk may include, e.g., obesity, diabetes, etc.

FIG. 1 is a high-level block diagram of a system 100 according to some embodiments of the present invention. In particular, the system 100 includes a back-end application computer server 150 server that may access information in a first risk relationship data store 110 (e.g., storing a set of electronic records representing risk associations, each record including, for example, one or more risk relationship identifiers, attribute variables, resource values, etc.). The back-end application computer server 150 may also retrieve information from other data stores or sources, such as a second risk relationship data store 120, in connection with a data mining engine 155, predictive analytics engine 156, and/or an insight platform 157 (e.g., a solution engine that automatically creates recommendations for an enterprise) to view, analyze, and/or update the electronic records. The back-end application computer server 150 may also exchange information with a first remote user device 160 and a second remote user device 162 (e.g., via a firewall 165). According to some embodiments, an interactive graphical user interface platform of the back-end application computer server 150 (and, in some cases, third-party data) may facilitate forecasts, decisions, predictions, and/or the display of results via one or more remote administrator computers (e.g., to gather additional information about an existing association) and/or the remote user devices 160, 162. For example, the first remote user device 160 may transmit annotated and/or tagged information to the back-end application computer server 150. Based on the updated information, the back-end application computer server 150 may adjust data in the first risk relationship data store 110 and the change may be viewable via the second remote user device 162. Note that the back-end application computer server 150 and/or any of the other devices and methods described herein might be associated with a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the access and/or update of electronic records in the first risk relationship data store 110. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the first risk relationship data store 110 and/or a second risk relationship data store 120 (e.g., associated with a different insurance company as compared to the first risk relationship data store). The data stores 110, 120 may be locally stored or reside remote from the back-end application computer server 150. As will be described further below, the first risk relationship data store 110 may be used by the back-end application computer server 150 in connection with an interactive user interface to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and an enterprise resource management server might be co-located and/or may comprise a single apparatus.

Figure 2:
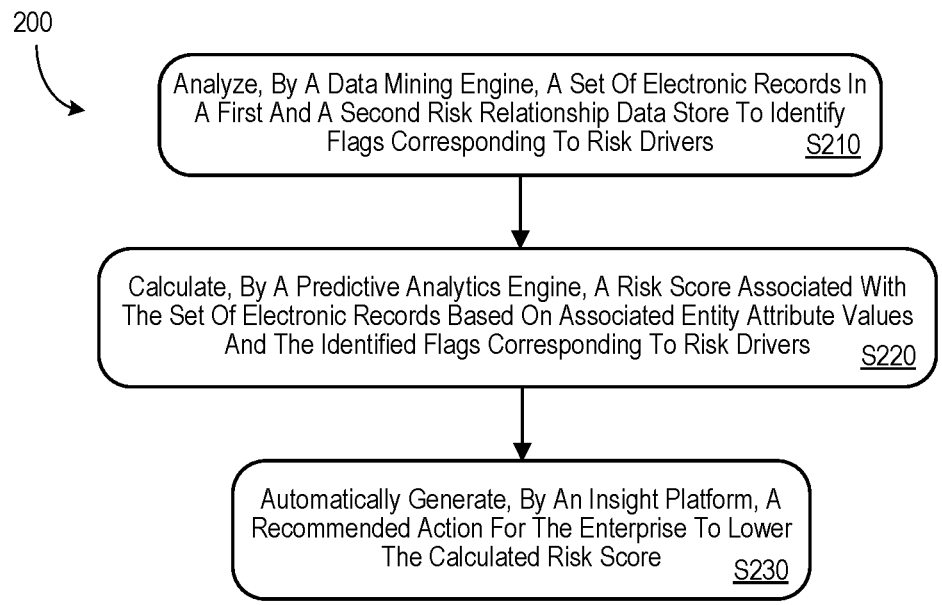
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a data mining engine of a back-end application computer server may analyze a set of electronic records in a first and a second risk relationship data store to identify flags corresponding to risk drivers. The first risk relationship data store may, for example, contain electronic records that represent a plurality of risk relationships between the enterprise and a first risk relationship provider (e.g., insurer). Similarly, the second risk relationship data store may contain electronic records that represent a separate plurality of risk relationships between the enterprise and a second risk relationship provider (e.g., if the first risk relationship data store is associated with pharmacy benefits, the second risk relationship data store may be associated with short or long term disability insurance claims).

At S220, a predictive analytics engine of the back-end application computer server may calculate a risk score associated with the set of electronic records based on associated entity attribute values and the identified flags corresponding to risk drivers. Note that the risk score may be based on information aggregated, combined, and/or blended from both the first risk relationship data store and the second risk relationship data store. At S230, an insight platform or solution engine of the back-end application computer server may automatically generate a recommended action for the enterprise to lower the calculated risk score (e.g., a risk mitigation strategy that relies on one or more insights that were learned by analyzing both the first and second risk relationship data stores together).

Figure 3:
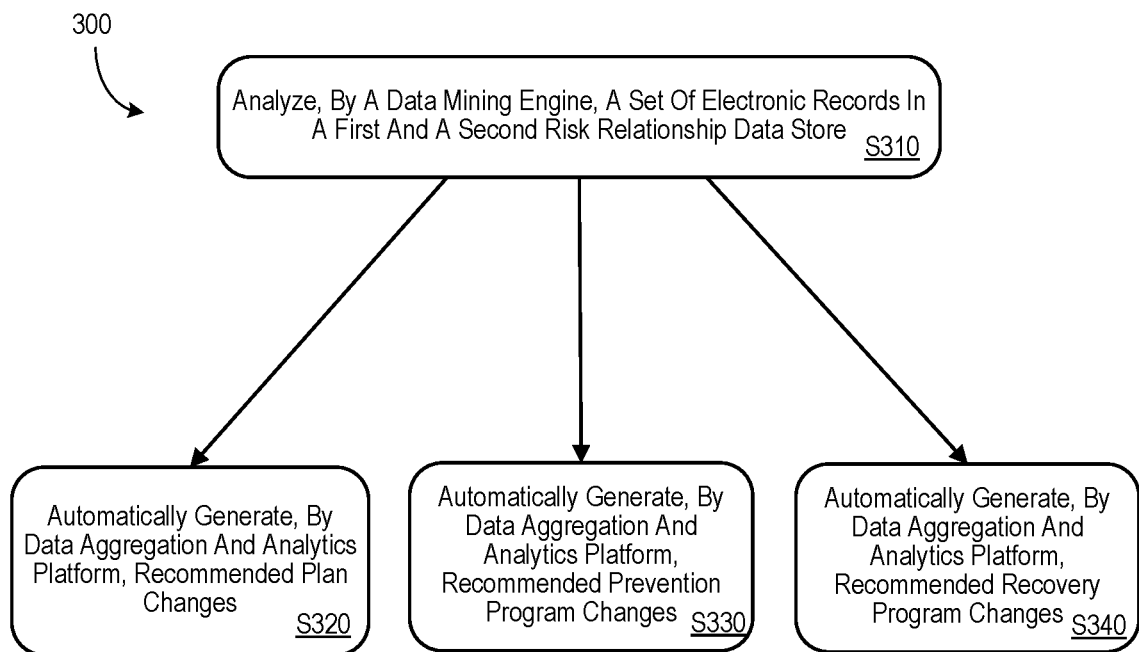
FIG. 3 is a data analytics method in accordance with some embodiments.

FIG. 3 is a data analytics method 300 in accordance with some embodiments. At S310, a data mining engine may analyze a set of electronic records in a first and second risk relationship data store. Based on the analysis at S310, the system may automatically generate recommended insurance plan changes at S320 (e.g., changing a deductible, adjusting employee funding or eligibility, changing benefit levels or coverage, etc.). Similarly, the system may automatically generate recommended prevention program changes at S330 (e.g., a smoking cessation program, installing a 5,000 square foot gym, screening and testing, offering on-site physical therapy, etc.). In other cases, the system might automatically generate recommended recovery program changes at S340 (e.g., associated with wellness referrals, etc.).

Figure 4:
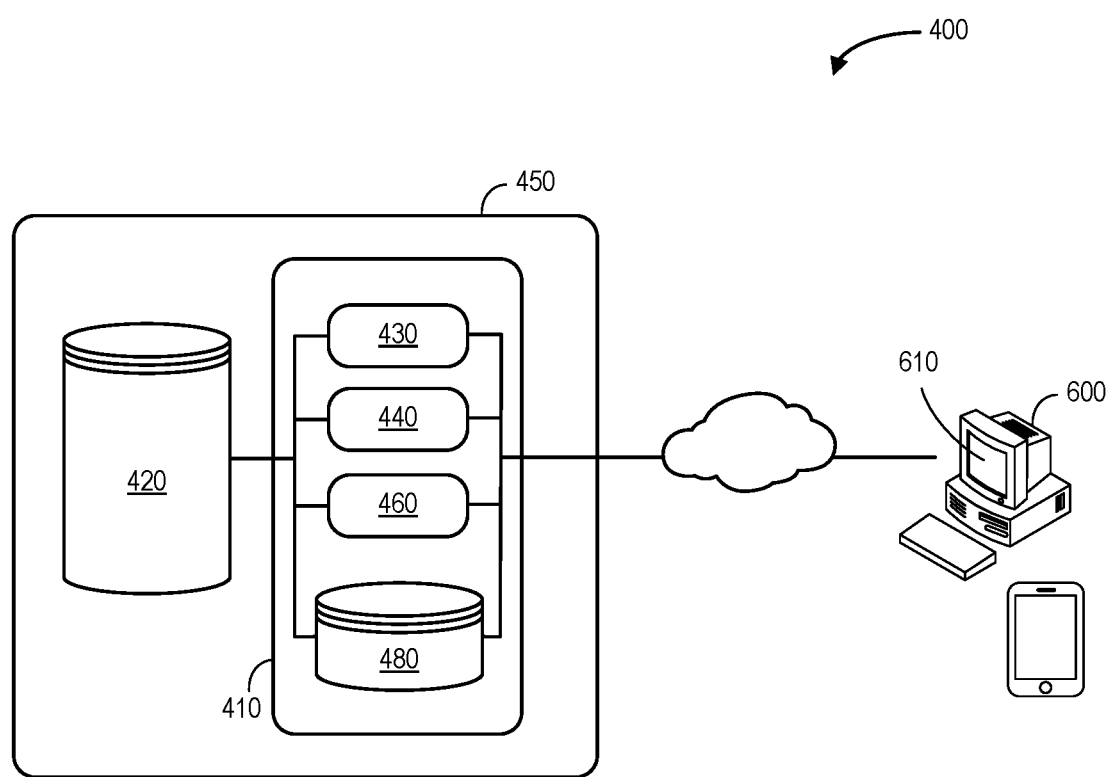
FIG. 4 is a schematic diagram of a claims insight factory according to some embodiments.

As shown in FIG. 4, a system 400 with a claims insight factory 450 may include one or more computer servers 410 in a centralized or distributed computing architecture. The computer server(s) 410 of claims insight factory 450 may be configured to include claims insight platform 430, data mining engine 440, predictive analytics engine 460, and database 480. Further, as shown in FIG. 4, the claims insight factory 450 may include claims data warehouse 420. The claims insight factory 450 communicates with remote computing device(s) 600 accessible by users. Computing device(s) 600 may be any suitable device (e.g., PC, laptop, tablet, smartphone, etc.) for communicating with claims insight factory 450 and rendering a GUI 610 to perform the functions described herein.

The functions of computer server(s) 410 described herein may be implemented using computer applications comprising computer program code stored in a non-transitory computer-readable medium that is executed by a computer processor. The functions of computer server(s) 410 described herein may also be implemented in programmable hardware devices such as field programmable gate arrays, programmable array logic, programmable logic devices or the like. Further, functions of computer server(s) 410 described herein may be implemented using some combination of computer program(s) executed by a computer processor and programmable hardware devices. Thus, computer server(s) 410 of the present application comprises suitable computer hardware and software for performing the desired functions and are not limited to any specific combination of hardware and software.

The executable computer program code may comprise one or more physical or logical blocks of computer instructions, which may be organized as an object, procedure, process or function. For example, the executable computer program code may be distributed over several different code partitions or segments, among different programs, and across several devices. Accordingly, the executable computer program need not be physically located together, but may comprise separate instructions stored in different locations which, when joined logically together, comprise the computer application and achieve the stated purpose for the computer application.

An insurance company may collect insurance claim data (e.g., insurance claim files) associated with various types of insurance (e.g., property and casualty insurance, group benefits insurance, workers' compensation insurance, etc.). The insurance company runs Extraction, Transformation, and Loading ("ETL") processes on collected insurance claim data (e.g., insurance claim files). The processed insurance claim data (e.g., insurance claim files) is loaded into a claims data warehouse 420. Accordingly, claims insight factory 450 may comprise a claims data warehouse 420 adapted to store insurance claim data (e.g., insurance claim files). The claims data warehouse 420 may comprise one or more data marts (e.g., dimensional data mart, analytic data mart, legacy data mart) adapted for different business functions. Each insurance claim file stored in claims data warehouse 420 may include insurance claim information such as, e.g., claimant/employee, customer/employer, employer industry, employer location, employer size, type of insurance claim (e.g., property and casualty, group benefits, workers' compensation, etc.), insurance claim cost, insurance claim duration, etc. In an alternative embodiment, claims insight factory 450 does not comprise claims data warehouse 420, but instead accesses insurance claim data (e.g., insurance claim files) in a stand-alone claims data warehouse 420.

Claims insight factory 450 mines the claim data stored in claims data warehouse 420 to automatically identify flags corresponding to certain risk drivers. Flags refer to items (e.g., text, codes, structured data fields, etc.) in insurance claim data (e.g., insurance claim files) that are indicative of certain risk drivers that may affect the outcomes of insurance claims. For example, claims insight platform 430 may include a data mining engine 440, e.g., such as the semantic rules system described in U.S. Pat. No. 9,026,551, which may be used to identify text flags (e.g., semantic events) in insurance claim data (e.g., insurance claim files) that trigger semantic rules. U.S. Pat. No. 9,026,551 is herein incorporated by reference in its entirety. Accordingly, data mining engine 440 may determine certain risk drivers associated with an insurance claim file based on the triggering of corresponding flags. For example, certain semantic rules may be associated with certain risk drivers, such that the triggering of a semantic rule leads to the identification of a corresponding risk driver. Thus, claims insight platform 430 may collect metrics of risk drivers for each insurance claim file in claims data warehouse 420. In an alternative embodiment, claims insight platform 430 does not comprise data mining engine 440, but instead may collect metrics of risk drivers for each insurance claim file in claims data warehouse 420 by directing a stand-alone data mining engine 440.

The claims insight factory 450 may use the determination of certain risk drivers associated with an insurance claim file to calculate one or more risk factor scores corresponding to one or more risk factors for the insurance claim file. For example, claims insight factory 450 may first use the determination of certain risk drivers associated with an insurance claim file to calculate the likelihood of certain events occurring (e.g., events delaying recovery in disability claims, subrogation, fraud, etc.). Then, for each insurance claim file, claims insight factory 450 may assign one or more risk factor scores corresponding to one or more risk factors based on the calculated likelihood of certain events occurring on the basis of the identified risk drivers.

Accordingly, the claims insight platform 430 may include a predictive analytics engine 460 that uses as an input the risk drivers associated with an insurance claim file and produces an output of one or more risk factor scores corresponding to one or more risk factors associated with the insurance claim file. predictive analytics engine 460 may comprise a knowledge base of historical insurance claim data and predictive models that can be implemented with the knowledge base to calculate the one or more risk factor scores corresponding to one or more risk factors associated with the insurance claim file on the basis of the identified risk drivers. According to some embodiments, for each claim file the predictive analytics engine 460 may generate risk factor scores for different risk factors (e.g., social risk score, psychological risk score, biological risk score, etc.) on the basis of the risk drivers identified for the insurance claim file. In an alternative embodiment, claims insight platform 430 does not comprise predictive analytics engine 460, but instead may collect risk factor scores for different risk factors (e.g., social risk score, psychological risk score, biological risk score, etc.) on the basis of the risk drivers identified for insurance claim files in claims data warehouse 420 by directing a stand-alone predictive analytics engine 460.

Figure 5:
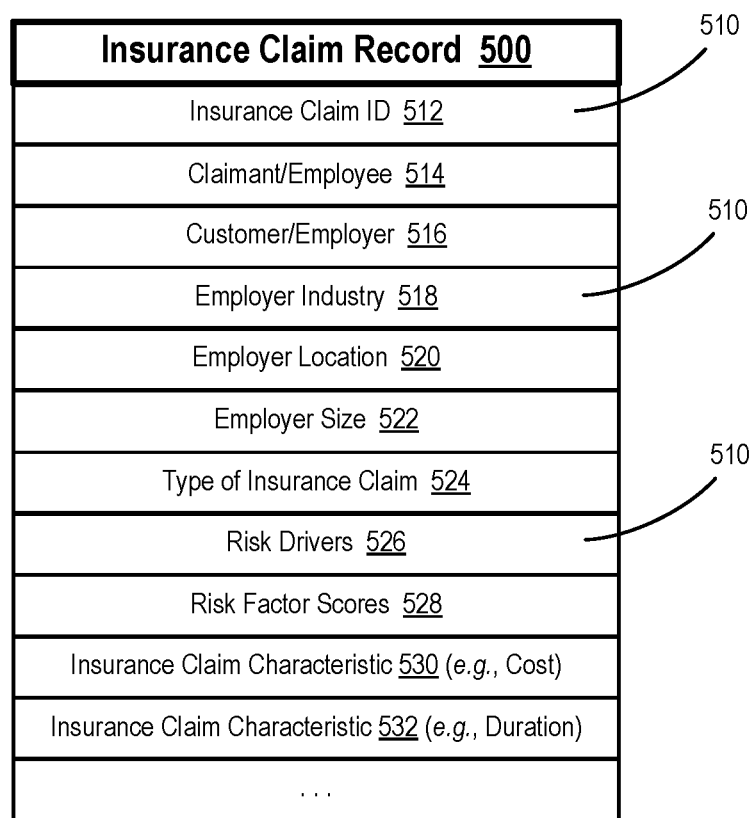
FIG. 5 is a schematic diagram of an insurance claim record according to some embodiments.

The claims insight factory 450 may further include a database 480 for storing insurance claim records 500 for associating information for each insurance claim file. As shown in FIG. 5, claim records 500 may include information stored in fields 510 including, e.g., insurance claim identifier 512, claimant/employee 514, customer/employer 516, employer industry 518, employer location 520, employer size 522, type of insurance claim 524 (e.g., property and casualty, group benefits, workers' compensation, etc.), identified risk drivers 526, risk factor scores 528, insurance claim characteristics (e.g., insurance claim cost 530, insurance claim duration 532), etc. insurance claim cost may refer to the expense to the insurance company for covering the insurance claim, and insurance claim duration may refer to the amount of time the insurance company provides benefits for the insurance claim. For example, for a worker's compensation claim, the cost may refer to medical expenses and other expenses (e.g., disability benefits, rehabilitation benefits, death benefits, etc.), and the duration may refer to the amount of time a claimant receives benefits for being unable to fully or partially perform their work.

The insurance claim information collected, generated and stored may be leveraged by claims insight factory 450 to provide benchmarking information. More particularly, claims insight factory 450 may benchmark the risk factor scores for insurance claim files of an analysis group against the risk factor scores for insurance claim files of a baseline group. Also, claims insight factory 450 may benchmark the claim outcomes (e.g., claim characteristics) of insurance claim files of an analysis group against the claim outcomes (e.g., claim characteristics) of insurance claim files of a baseline group. The analysis group of insurance claim files is selected based on analysis selection criteria, and the baseline group of insurance claims is selected based on baseline selection criteria. Analysis selection criteria for selecting an analysis group of insurance claim files may be a field 510 attribute or combination of field 510 attributes in insurance claim records 500 stored in database 480. Likewise, baseline selection criteria for selecting a baseline group of insurance claim files may also be a field 510 attribute or combination of field 510 attributes in insurance claim records 500 stored in database 480. For example, the risk factor scores for the insurance claim files of a selected customer may be benchmarked against the risk factor scores for the insurance claim files of other customers in the same industry, in the same geographical region and/or of about the same size (e.g., number of employees).

The claims insight factory 450 may further include a claims insight platform 430. Once the analysis selection criteria for the analysis group are entered in claims insight platform 430, claims insight platform 430 queries database 480 for insurance claim records satisfying the analysis selection criteria. The claims insight platform 430 then determines composite risk factor scores for the insurance claim files of the analysis group according to a selected analysis composite score basis (e.g., customer-by-customer basis, claimant-by-claimant basis, etc.). The claims insight platform 430 may calculate a composite risk factor score for a selected risk factor according to the selected analysis composite score basis by taking the average of all the risk factor scores for the selected risk factor for the insurance claim files of the analysis group according to the selected analysis composite score basis.

For example, if the analysis selection criterion is a selected customer, then the database 480 query returns all the insurance claim records 500 associated with the selected customer (i.e., the analysis group of insurance claim files). Then, the claims insight platform 430 may calculate composite risk factor scores for the insurance claim files of the analysis group according to a selected analysis composite score basis (e.g., customer-by-customer basis, claimant-by-claimant basis, etc.). For instance, if the analysis composite score basis is a customer-by-customer basis, claims insight platform 430 may calculate the composite social risk factor score for the selected customer by taking the average of all the social risk factor scores for all the insurance claim files associated with the selected customer. Similarly, claims insight platform 430 may calculate the composite psychological risk factor score for the selected customer by taking the average of all the psychological risk factor scores for all the insurance claim files associated with the selected customer. Further, claims insight platform 430 may calculate the composite biological risk factor score for the selected customer by taking the average of all the biological risk factor scores for all the insurance claim files associated with the selected customer.

In another example, if the analysis composite score basis is a claimant-by-claimant basis, the claims insight platform 430 may calculate the composite social risk factor score for each claimant in the analysis group by taking the average of the social risk factor scores for the insurance claim files on a claimant-by-claimant basis. Similarly, claims insight platform 430 may calculate the composite psychological risk factor score for each claimant in the analysis group by taking the average of the psychological risk factor scores for the insurance claim files on a claimant-by-claimant basis. Further, claims insight platform 430 may calculate the composite biological risk factor score for each claimant in the analysis group by taking the average of the biological risk factor scores for the insurance claim files on a claimant-by-claimant basis.

Once the baseline selection criteria for the baseline group are entered in claims insight platform 430, the claims insight factory 450 queries database 480 for insurance claim records 500 satisfying the baseline selection criteria. The claims insight platform 430 then determines composite risk factor scores for the insurance claim files of the baseline group according to a selected baseline composite score basis (e.g., customer-by-customer basis, claimant-by-claimant basis, etc.). The claims insight platform 430 may calculate a composite risk factor score for a selected risk factor by taking the average of all the risk factor scores for the selected risk factor for the insurance claim files of the baseline group according to the selected baseline composite score basis (e.g., customer-by-customer basis, claimant-by-claimant basis, etc.).

For example, if the baseline selection criterion is a selected industry, then the database 480 query returns all the insurance claim records 500 associated with the selected industry (i.e., the baseline group of insurance claim files). If the baseline selection criteria is a selected geographic region and a selected company size range (e.g., 500-1,000 employees), then the database 480 query returns all of the insurance claim records 500 associated with the selected geographic region and company size range (i.e., the baseline group of insurance claim files). Then, claims insight platform 430 may calculate composite risk factor scores for the insurance claim files of the baseline group according to a selected baseline composite score basis (e.g., customer-by-customer basis, claimant-by-claimant basis, etc.). For instance, if the baseline composite score basis is a customer-by-customer basis, then claims insight platform 430 may calculate the composite social risk factor score for each customer in the baseline group by taking the average of the social risk factor scores for the insurance claim files on a customer-by-customer basis. Similarly, claims insight platform 430 may calculate the composite psychological risk factor score for each customer in the baseline group by taking the average of the psychological risk factor scores for the insurance claim files on a customer-by-customer basis. Further, claims insight platform 430 may calculate the composite biological risk factor score for each customer in the baseline group by taking the average of the biological risk factor scores for the insurance claim files on a customer-by-customer basis.

In another example, if the baseline composite score basis is a claimant-by-claimant basis, the claims insight platform 430 may calculate the composite social risk factor score for each claimant in the baseline group by taking the average of the social risk factor scores for the insurance claim files on a claimant-by-claimant basis. Similarly, claims insight platform 430 may calculate the composite psychological risk factor score for each claimant in the analysis group by taking the average of the psychological risk factor scores for the insurance claim files on a claimant-by-claimant basis. Further, claims insight platform 430 may calculate the composite biological risk factor score for each claimant in the analysis group by taking the average of the biological risk factor scores for the insurance claim files on a claimant-by-claimant basis.

Further, the claims insight platform 430 may provide users access to claims insight factory 450 via GUIs 610 rendered on remote computing devices 600 in communication with claims insight platform 430. For instance, a user may enter the analysis selection criteria, analysis composite score basis, baseline selection criteria and baseline composite score basis via a GUI 610 rendered on a computing device 600 in communication with claims insight platform 430. Further, claims insight platform 430 provides users benchmarking analysis according to the selected analysis selection criteria, analysis composite score basis, baseline selection criteria and baseline composite score basis received from the user via the GUI 610 rendered on the computing device 600.

Figure 6:
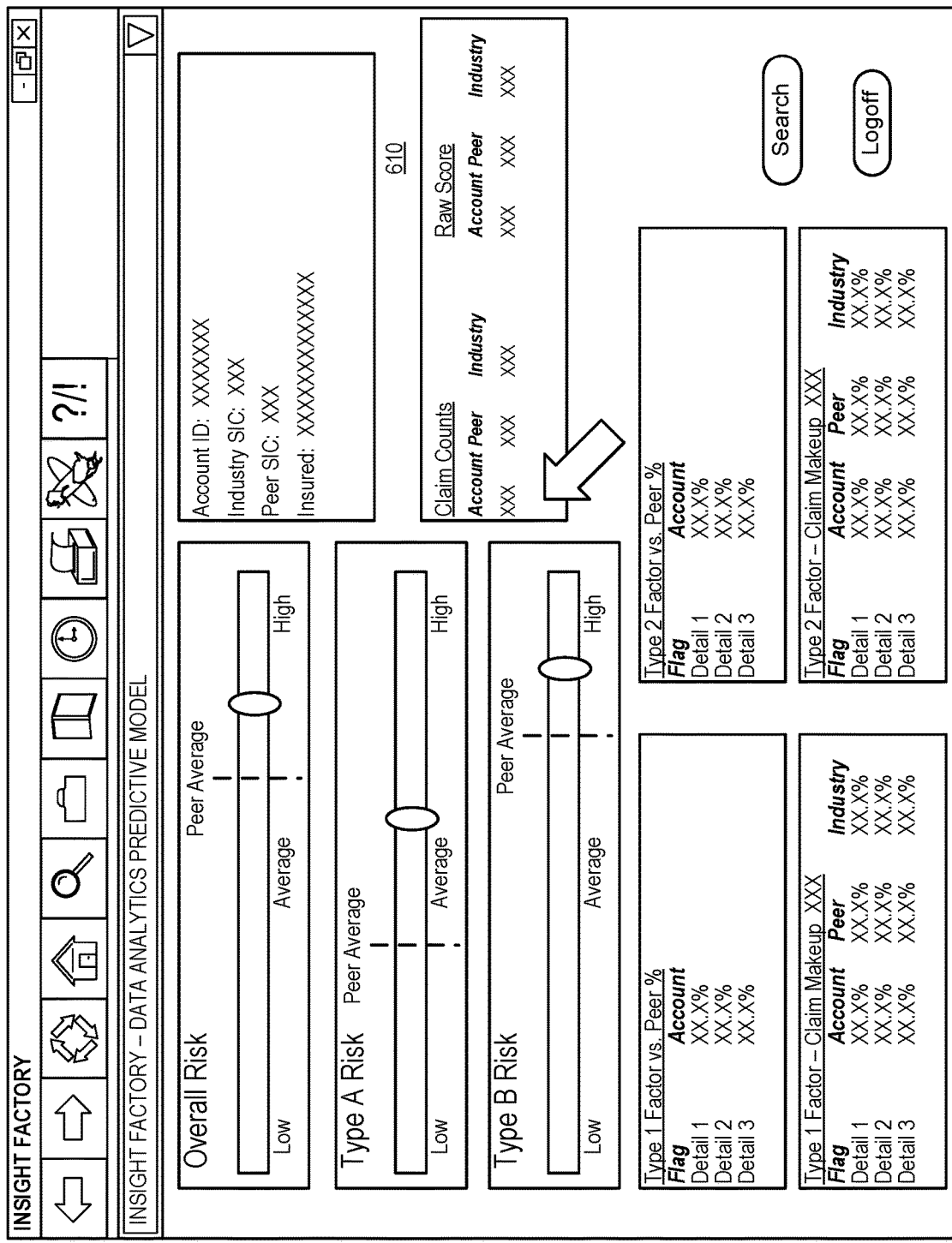
FIG. 6 is a GUI display of an overall score breakdown for account/peer and industry according to some embodiments.

For example, the claims insight platform 430 may execute benchmark analysis of the risk factor scores for insurance claim files of an analysis group against the risk factor scores for insurance claim files of a baseline group in accordance with user specified analysis selection criteria, analysis composite score basis, baseline selection criteria and baseline composite score basis. FIG. 6 shows an exemplary GUI 610 for a Type A Risk Score, Type B Risk Score, and a Type C Risk Score. For the purposes or discussion, the Type A Risk Score will be considered to be a Social Risk Score, the Type B Risk Score will be considered to be a Psychological/Comorbidity Risk Score, and the Type C Risk Score will be considered to be a Health Comorbidity Risk Score (although embodiments may be associated with any other risk score types). For the benchmark analysis of FIG. 6, the analysis selection criteria is the selected customer, the analysis composite score basis is a customer-by-customer basis, the baseline selection criteria is the industry of the selected customer and the baseline composite score basis is a customer-by-customer basis.

FIG. 6 shows a GUI display 610 on a computer 600 for various types of risk factor scores (e.g., social risk score, psychological risk score, biological risk score, etc.) for insurance claim files associated with the selected customer compared against the risk factor scores for the insurance claim files of other customers in the same industry as the selected customer. The benchmark analysis provides an indication of how the selected customer's risk factor scores (e.g., social risk score, psychological risk score, biological risk score) compares to the risk factor scores of other customers in the same industry.

Additionally, the benchmark analysis may include an indication of how the risk factor scores for the insurance claim files of the analysis group affect the claim outcomes (e.g., claim characteristics) of different types of claims compared to the risk factor scores for the insurance claim files of the baseline group. For example, for a given benchmark analysis for the risk factor scores of an analysis group compared to the risk factor scores of a baseline group, claims insight platform 430 may calculate how the risk factor scores for the insurance claim files of the analysis group affect the claim outcomes (e.g., claim characteristics) of a selected type of insurance claim (e.g., property and casualty, group benefits, workers' compensation, etc.) compared to the risk factor scores for the insurance claim files of the baseline group.

The benchmark analysis of FIG. 6 might show how the selected customer's risk factor scores (e.g., social risk score, psychological risk score, biological risk score) affect the claim characteristics (e.g., medical expense, other expense, duration) for workers' compensation insurance claims compared to the risk factor scores of other customers in the same industry. \ The benchmark analysis of FIG. 6 might also show that the lowest 10% social risk scores for the baseline group (e.g., other customers in the same industry) result in workers' compensation claims with X % lower medical expenses, Y % lower other expenses, and Z % shorter duration compared to the social risk score for the analysis group (e.g., the selected customer). The benchmark analysis of FIG. 6 might further show that the highest 10% social risk scores for the baseline group (e.g., other customers in the same industry) result in workers' compensation claims with A % higher medical expenses, B % higher other expenses and C % longer duration compared to the social risk score for the analysis group (e.g., the selected customer).

The claims insight platform 430 may execute the claim characteristics analysis for a selected type of insurance claim based on stored historical data of insurance claim records 500 for the selected type of insurance claim. The claims insight platform 430 may query database 480 for insurance claim records 500 for the selected type of insurance claim that have the same risk factor scores as the analysis group and the same risk factor scores as some specified risk factor scores of the baseline group. Then, claims insight platform 430 may calculate the average claim characteristic values for the insurance claim records 500 having the same risk factor scores as the analysis group and the same risk factor scores as some specified risk factor scores of the baseline group. In the context of the risk factor scores, "same" does not necessarily mean identical and may mean substantially the same within a specified range (e.g., +/−5%).

For instance, for the benchmark analysis of FIG. 6, the claims insight platform 430 may query database 480 for insurance claim records 500 for the selected type of insurance claim (e.g., workers' compensation claims) that have the same social risk score, psychological risk score or biological risk score as the analysis group (e.g., the selected customer). Accordingly, the database query will return insurance claim records 500 for workers' compensation claims that have the same social risk score as the analysis group (e.g., the selected customer), insurance claim records 500 for workers' compensation claims that have the same psychological risk score as the analysis group (e.g., the selected customer) and insurance claim records 500 for workers' compensation claims that have the same biological risk score as the analysis group (e.g., the selected customer).

Then, based on the insurance claim information associated with the insurance claim records 500 returned by the query, the claims insight platform 430 may calculate the average claim characteristic values (e.g., medical expenses, other expenses and duration) corresponding to each risk factor score (e.g., social risk score, psychological risk score, biological risk score) of the analysis group (e.g., the selected customer). For example, for the benchmark analysis of FIG. 6, claims insight platform 430 calculates the average medical expense value, average other expense value and average duration value for insurance claim records 500 returned by the query having the same social risk score as the analysis group (e.g., the selected customer). Similarly, claims insight platform 430 calculates the average medical expense value, average other expense value and average duration value for insurance claim records 500 returned by the query having the same psychological risk score as the analysis group (e.g., the selected customer). Further, claims insight platform 430 calculates the average medical expense value, average other expense value and average duration value for insurance claim records 500 returned by the query having the same biological risk score as the analysis group (e.g., the selected customer).

Also, for the benchmark analysis of FIG. 6, the claims insight platform 430 may query database 480 for insurance claim records 500 for the selected type of insurance claim (e.g., workers' compensation claims) that have the same social risk score, psychological risk score or biological risk score as some specified risk factor score (e.g., average, highest 10%, lowest 10%, etc.) of the baseline group (e.g., other customers in the same industry). Accordingly, the database query will return insurance claim records 500 for workers' compensation claims that have the same social risk score as some specified social risk factor Score (e.g., average, highest 10%, lowest 10%, etc.) of the baseline group (e.g., other customers in the same industry), insurance claim records 500 for workers' compensation claims that have the same psychological risk score as some specified psychological risk factor score (e.g., average, highest 10%, lowest 10%, etc.) of the baseline group (e.g., other customers in the same industry) and insurance claim records 500 for workers' compensation claims that have the same biological risk score as some specified biological risk factor score (e.g., average, highest 10%, lowest 10%, etc.) of the baseline group (e.g., other customers in the same industry).

Then, based on the insurance claim information associated with the insurance claim records 500 returned by the query, the claims insight platform 430 may calculate the average claim characteristic values (e.g., medical expenses, other expenses and duration) corresponding to each specified risk factor score (e.g., social risk score, psychological risk score, biological risk score) of the baseline group (e.g., other customers in the same industry). For example, for the benchmark analysis of FIG. 6, claims insight platform 430 might calculate the average medical expense value, average other expense value and average duration value for insurance claim records 500 having a social risk score that is the same as the average social risk score of the baseline group; the average medical expense value, average other expense value and average duration value for insurance claim records 500 having social risk scores that are the same as the lowest 10% social risk scores of the baseline group; and the average medical expense value, average other expense value and average duration value for insurance claim records 500 having social risk scores that are the same as the highest 10% social risk scores of the baseline group. Similarly, claims insight platform 430 could calculate the average medical expense value, average other expense value and average duration value for insurance claim records 500 having a psychological risk score that is the same as the average psychological risk score of the baseline group; the average medical expense value, average other expense value and average duration value for insurance claim records 500 having psychological risk scores that are the same as the lowest 10% psychological risk scores of the baseline group; and the average medical expense value, average other expense value and average duration value for insurance claim records 500 having psychological risk scores that are the same as the highest 10% social risk scores of the baseline group. Further, claims insight platform 430 might calculate the average medical expense value, average other expense value and average duration value for insurance claim records 500 having a biological risk score that is the same as the average biological risk score of the baseline group; the average medical expense value, average other expense value and average duration value for insurance claim records 500 having biological risk scores that are the same as the lowest 10% biological risk scores of the baseline group; and the average medical expense value, average other expense value and average duration value for insurance claim records 500 having biological risk scores that are the same as the highest 10% biological risk scores of the baseline group.

Accordingly, based on the claims insight platform's 430 calculations described above, claims insight platform 430 may determine how claim characteristic values for insurance claims having the same risk factor score as the analysis group compare to the claim characteristic values of insurance claims having some specified value of the risk factor score (e.g., average, highest 10%, lowest 10%, etc.) of the baseline group. As shown in the benchmark analysis of FIG. 6, claims insight platform 430 may provide an indication (e.g., +/−percentage values) of how claim characteristic values for insurance claims having one risk factor score compare to the claim characteristic values of insurance claims having another risk factor score.

Also, the claims insight platform 430 may provide account level data aggregations or claimant level data aggregations by aggregating information for all insurance claim records 500 associated with a selected account or a selected claimant, respectively. Thus, claims insight platform 430 may provide insurance claim information on an account wide basis or a claimant-by-claimant basis. Also, the metrics of risk drivers for insurance claim files associated with a particular account may be aggregated to generate an account profile. Account profile may define different risk factors (i.e., risk categories), including, e.g., social risk, psychological risk, biological risk, etc., and may identify an account's specific risk drivers for each risk factor. Similarly, the metrics of risk drivers for insurance claim files associated with a particular claimant may be aggregated to generate a claimant profile. Claimant profile may define different risk factors (i.e., risk categories), including, e.g., social risk, psychological risk, biological risk, etc., and may identify a claimant's specific risk drivers for each risk factor.

Figure 7:
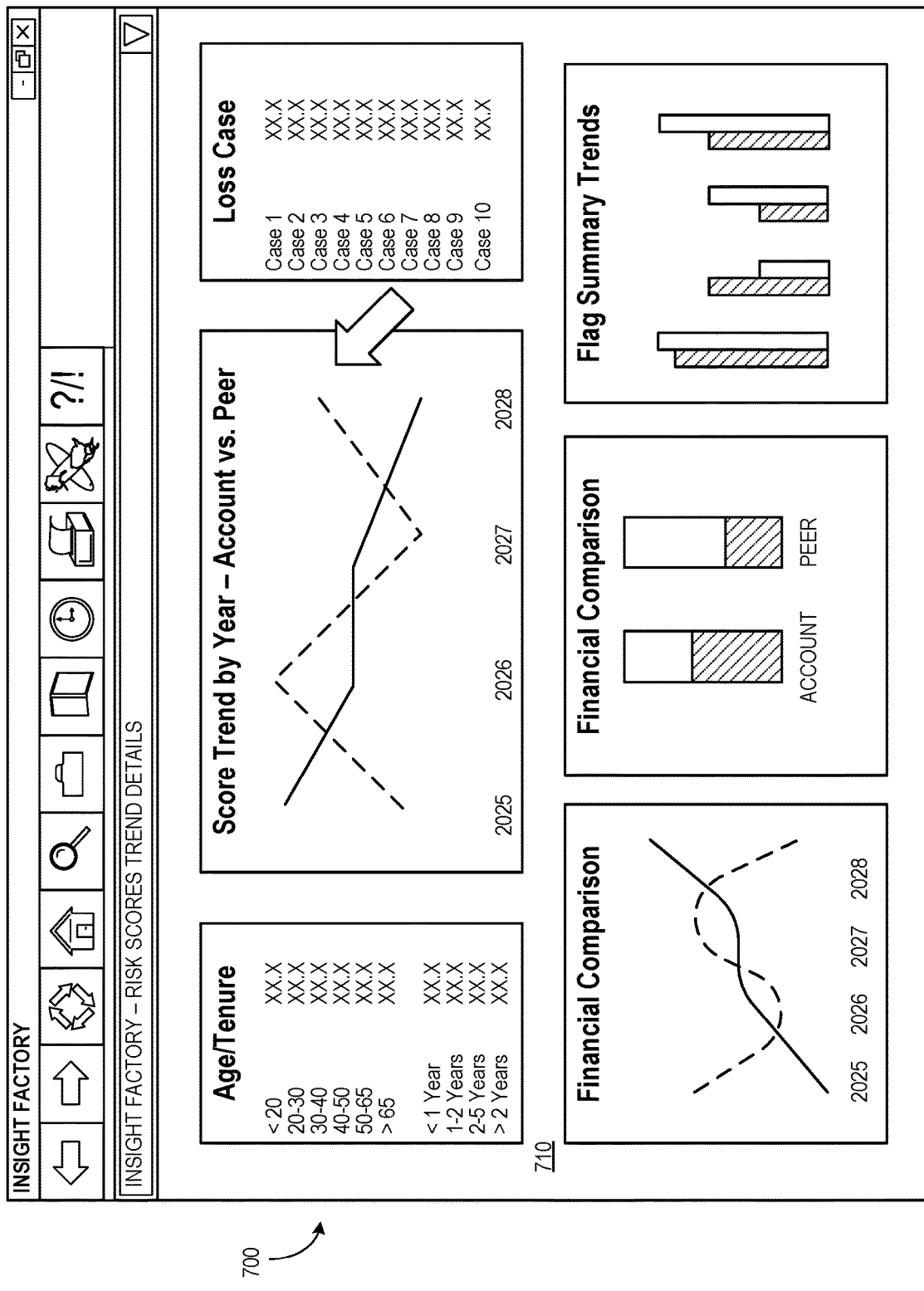
FIG. 7 is another GUI display of an overall score breakdown according to some embodiments.

FIG. 7 shows a GUI dashboard display 710 on a computer 700 with details of an overall risk score breakdown. The display 710 might include a risk score trend analysis (e.g., by age group or tenure, a score trend graph over a period of years, a tabular presentation of various loss case values, etc.). The display 710 may further include financial comparisons (e.g., account and peer), claim make-up charts (e.g., account and peer), flag summary trends, etc.

The claims insight platform 430 may automatically generate a report for any benchmark analysis performed and may automatically send the benchmark analysis report to the customer/employer and/or claimant/employee. Also, claims insight platform 430 may automatically generate reports for account profiles and claimant profiles and may automatically send the account profile reports and claimant profile reports to their respective customer/employer and claimant/employee. Additionally, benchmark analysis reports, account profile reports and claimant profile reports may be stored by claims insight platform 430 and accessed and viewed by users via the GUI 610 rendered on a computer device.

Additionally, the information identified in benchmark analysis reports account profile reports and claimant profile reports (e.g., identification of key risk drivers, benchmarking of risk factors) may be leveraged by claims insight factory 450 to provide risk mitigation recommendations to claimants/employees and/or customers/employers. For example, claims insight platform 430 may automatically generate recommendations for claimants/employees and/or customers/employers based on information identified in benchmark analysis reports, account profile reports and claimant profile reports (e.g., identification of key risk drivers, benchmarking of risk factors). For example, if the claims insight platform's 430 data analysis reveal that there are certain risk drivers that are negatively affecting insurance claim outcomes, claims insight platform 430 may automatically generate recommendations to help claimants/employees or customers/employers address some of the identified key risk drivers.

The nature of the recommendations will depend on the nature of the risk drivers. For example, if an identified risk driver is missed medical appointments, then claims insight platform 430 may recommend providing appointment reminders, transportation services and/or more conveniently located medical service providers. In another example, if an identified risk driver is a bad relationship with medical service provider, then claims insight platform 430 may recommend switching medical service providers. The claims insight platform 430 provides actionable items in the form of risk mitigation services and/or risk mitigation strategies that are aimed at preventing loss and/or decreasing the duration of loss. To that end, claims insight platform 430 may automatically follow up with claimants/employees and/or customers/employers via automated electronic communication (e.g., email, text message, phone call, etc.) to confirm that recommended actionable items were carried out.

Figure 8:
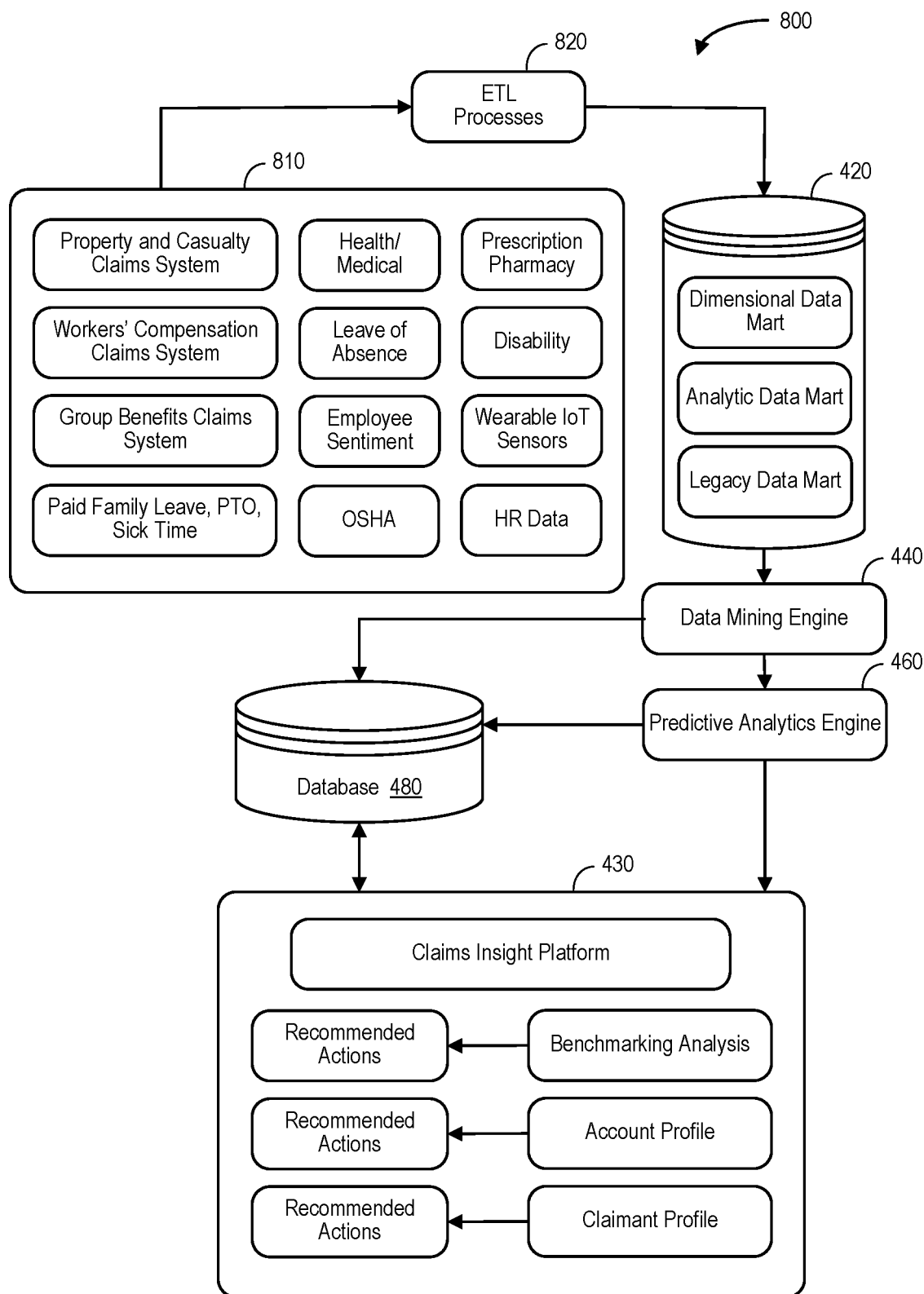
FIG. 8 is a schematic workflow of a claims insight factory according to some embodiments.

FIG. 8 shows an exemplary flow diagram 800 for the operation of the exemplary claims insight platform 430 of FIG. 4. Initially, information about various types of workplace absences 810 may be collected. The information might be associated with, for example, workers' compensation claims, short or long-term disability insurance, human resources data, wearable Internet of Things ("IoT") sensors, etc. An insight factory and holistic reporting platform may then analyze the collected information any apply machine learning or other techniques to generate solutions for an enterprise. For example, it might be determined that a change in an employee deductible amount will encourage (or discourage) certain treatment behaviors (and perhaps reduce to the duration of out-of-work absences. The system may be used to aggregate data to enable insights to answer questions such as:

How does the disability duration rate differ for those with an emergency room sponsored health plan as compared to those without?

What is the average health and pharmacy spend for individuals with a disability claim?

How often are preventative care and treatments seen pre-claim?

Note that an aggregation and analytics platform may collect information from various data sources, such as health/medical data, prescription pharmacy data, leave of absence data, workers' compensation data, disability data, etc. The platform may then aggregate the information and apply analytic techniques to generate dashboard displays (e.g., to keep managers up-to-date about risk relationships), generate insights (e.g., recommended actions for the enterprise), etc.

Insurance claim data (e.g., insurance claim files) 410 associated with various types of insurance (e.g., property and casualty insurance, group benefits insurance, workers' compensation insurance, etc.) is collected. The ETL processes 820 are run on the collected insurance claim data 410 (e.g., insurance claim files). The processed insurance claim data (e.g., insurance claim files) is loaded into a claims data warehouse 420. The claims data warehouse 420 is adapted to store insurance claim data (e.g., insurance claim files) and may comprise one or more data marts (e.g., dimensional data mart, analytic data mart, legacy data mart) adapted for different business functions. Each insurance claim file stored in claims data warehouse 420 may include insurance claim information such as, e.g., claimant/employee, customer/employer, employer industry, employer location, employer size, type of insurance claim (e.g., property and casualty, group benefits, workers' compensation, etc.), insurance claim cost, insurance claim duration, etc.

The claims insight platform 430 mines the claim data stored in claims data warehouse 420 to automatically identify flags corresponding to certain risk drivers. Flags refer to items (e.g., text, codes, structured data fields, etc.) in insurance claim data (e.g., insurance claim files) that are indicative of certain risk drivers that may affect the outcomes of insurance claims. For example, claims insight platform 430 may include a data mining engine 440, e.g., such as the semantic rules system described in U.S. Pat. No. 9,026,551, which may be used to identify text flags (e.g., semantic events) in insurance claim data (e.g., insurance claim files) that trigger semantic rules. U.S. Pat. No. 9,026,551 is herein incorporated by reference in its entirety. Thus, claims insight platform 430 may collect metrics of risk drivers for each insurance claim file in claims data warehouse 420.

The claims insight platform 430 uses the determination of certain risk drivers associated with an insurance claim file to calculate one or more risk factor scores corresponding to one or more risk factors for the insurance claim file. For example, claims insight platform 430 may include a predictive analytics engine 460 that uses as an input the risk drivers associated with an insurance claim file and produces an output of one or more risk factor scores corresponding to one or more risk factors associated with the insurance claim file. The predictive analytics engine 460 may comprise a knowledge base of historical insurance claim data and predictive models that can be implemented with the knowledge base to calculate the one or more risk factor scores corresponding to one or more risk factors associated with the insurance claim file on the basis of the identified risk drivers. Accordingly, for each claim file, predictive analytics engine 460 may generate risk factor scores for different risk factors (e.g., social risk score, psychological risk score, biological risk score, etc.) on the basis of the risk drivers identified for the insurance claim file.

The claims insight platform 430 may further include a database 480 for storing insurance claim records 500 for associating information for each insurance claim file, including information determined/generated by data mining engine 440 and predictive analytics engine 460. The claims insight platform 430 may execute the claim characteristics analysis for a selected type of insurance claim based on stored historical data of insurance claim records 500 for the selected type of insurance claim. Also, claims insight platform 430 may provide account level data aggregations or claimant level data aggregations by aggregating information for all insurance claim records 500 associated with a selected account or a selected claimant, respectively. Thus, claims insight platform 430 may provide insurance claim information on an account wide basis or a claimant-by-claimant basis. Also, the metrics of risk drivers for insurance claim files associated with a particular account may be aggregated to generate an account profile. Similarly, the metrics of risk drivers for insurance claim files associated with a particular claimant may be aggregated to generate a claimant profile.

The claims insight platform 430 may automatically generate a report for any benchmark analysis performed and may automatically send the benchmark analysis report to the customer/employer and/or claimant/employee. Also, claims insight platform 430 may automatically generate reports for account profiles and claimant profiles and may automatically send the account profile reports and claimant profile reports to their respective customer/employer and claimant/employee.

Additionally, benchmark analysis reports, account profile reports and claimant profile reports may be stored by claims insight platform 430 and accessed and viewed by users via the GUI 610 rendered on a computer device 600. Additionally, the information identified in benchmark analysis reports account profile reports and claimant profile reports (e.g., identification of key risk drivers, benchmarking of risk factors) may be leveraged by claims insight platform 430 to provide risk mitigation recommendations to claimants/employees and/or customers/employers. For example, claims insight platform 430 may automatically generate recommendations for claimants/employees and/or customers/employers based on information identified in benchmark analysis reports, account profile reports and claimant profile reports (e.g., identification of key risk drivers, benchmarking of risk factors). For example, if the claims insight platform's 430 data analysis reveal that there are certain risk drivers that are negatively affecting insurance claim outcomes, claims insight platform 430 may automatically generate recommendations to help claimants/employees or customers/employers address some of the identified key risk drivers.

Figure 9:
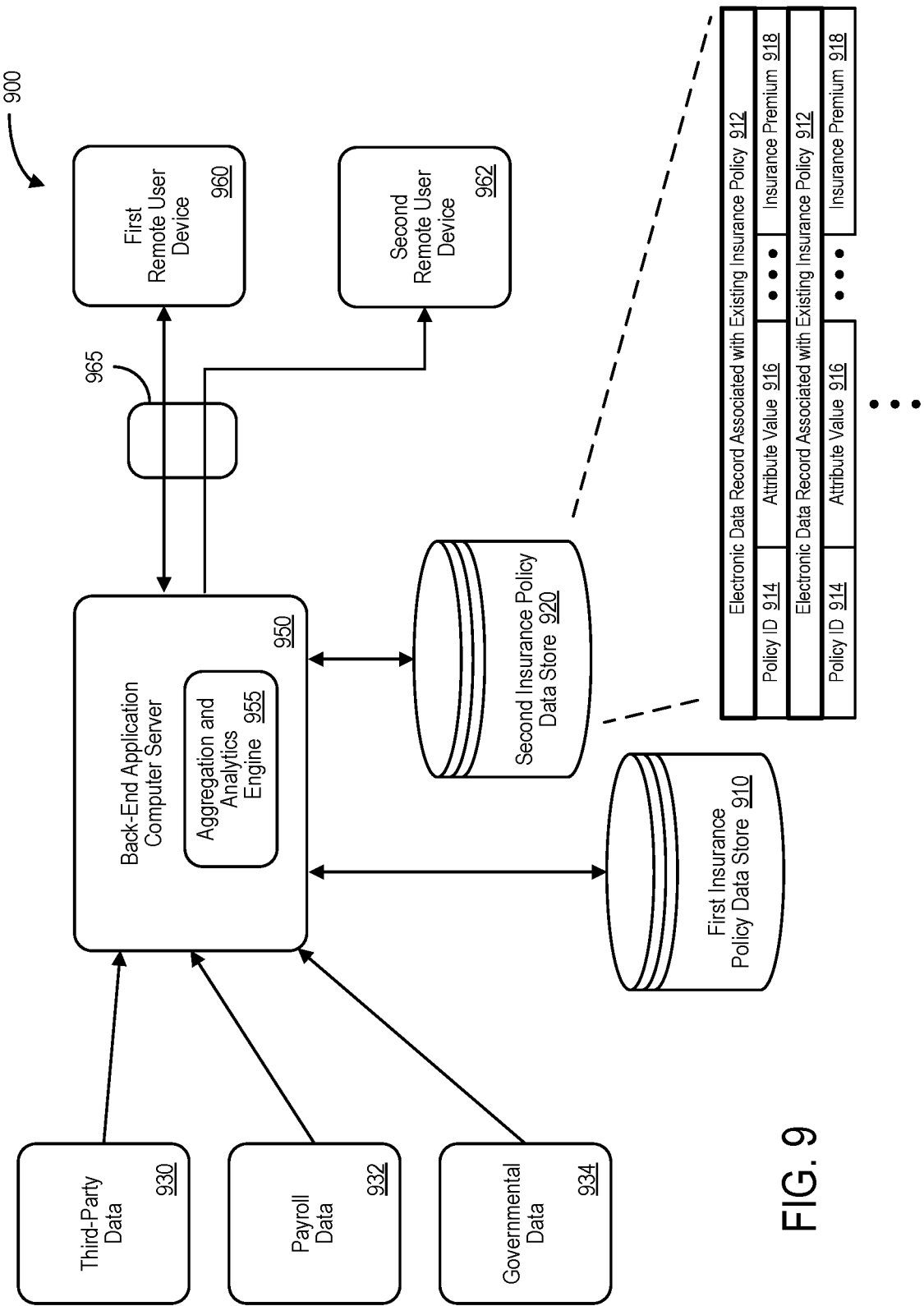
FIG. 9 is a more detailed block diagram of a system according to some embodiments.

FIG. 9 is a more detailed block diagram of a system 900 according to some embodiments. As before, the system 900 includes a back-end application computer server 950 that may access information in a first insurance policy data store 910 and a second insurance policy data store 920 (e.g., storing a set of electronic records 912 representing insurance policies, each record including, for example, one or more insurance policy identifiers 914, attribute variables 916, insurance premiums 918, etc.). The back-end application computer server 950 may also retrieve information from other data stores or sources in connection with an aggregation and analytics engine 955 to access, verify, analyze, and/or update the electronic records. The back-end application computer server 950 may also exchange information with remote user devices 960, 962 (e.g., via a firewall 965). According to some embodiments, an interactive graphical user interface platform of the back-end application computer server may facilitate forecasts, decisions, predictions, and/or the display of results via one or more remote administrator computers (e.g., to gather additional information about an existing or potential association) and/or the remote user devices 960, 962.

According to some embodiments, the back-end application computer server 950 may also receive external information, such as third-party data 930 (e.g., providing Occupational Safety and Health Administration ("OSHA") information), payroll data 932, governmental data 934, credit score data (e.g., associated with a level of risk), map or search result data, and social media data (e.g., a number of friends or likes on a web site). This data might be used, for example, to pre-populate fields in the first insurance policy data store 910. A user may then review the information via remote user devices 960, 962 and transmit updated information to the back-end application computer server 950 (e.g., by tagging an entity). Based on the updated information, the back-end application computer server 950 may adjust data in the first insurance policy data store 910 and make that information available to other employees of an enterprise as appropriate. According to some embodiments, the back-end application computer server 950 may transmit information to an email server, workflow application, a chatbot text interface, a streaming video interface, a voice recognition application, or a calendar function (e.g., to generate reminders that recommendation should be implemented). This information might be used by the system 900, for example, to automatically establish a channel of communication with an entity, automatically transmit a message to an entity, etc. Similarly, the back-end application computer server 950 might transmit updated electronic records 912 to an underwriter device for manual review and a determination of a proposed or approximate insurance premium.

Figure 10:
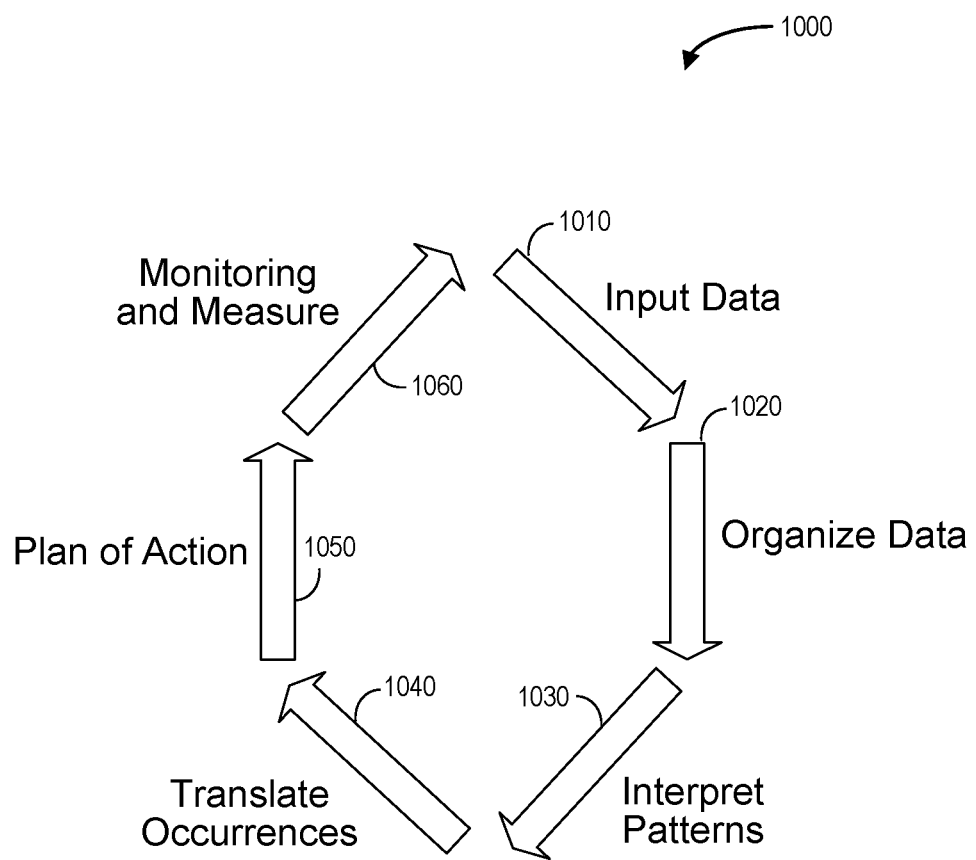
FIG. 10 is a process flow diagram according to some embodiments.

FIG. 10 is a process flow diagram 1000 according to some embodiments. Initially, during an input data step 1010 claims may be securely entered into a data warehouse. Next, during an organize data step 1020 the claims may put into, for example, cost and/or risk categories. During an interpret patterns step 1030, the system may perform a deep dive evaluation to identify actionable overspending and plan efficiency opportunities. During a translate occurrences step 1040, the system may leverage benchmarks and clinical intelligence to identify areas of focus. Next, during a plan of action step 1050 an action plan may be identified to address key concerns and/or wellbeing professional may drive outcomes. Finally, during a monitor and measure step 1060, the system may evaluate program performance. Some or all of the steps shown in FIG. 12 may thus form, or be part of, a recommendation or solution engine that automatically proposes suggestions that an enterprise may use to mitigate risk. For example, the monitoring and measuring outcomes step 1060 may provide insights that can be used to generate suggestions for other, similar situations (either for the same enterprise or other enterprises). Moreover, in some embodiments the system may monitor data to determine if previous recommendations were incorporated by the enterprise and/or if the results of those changes were as predicted.

Figure 11:
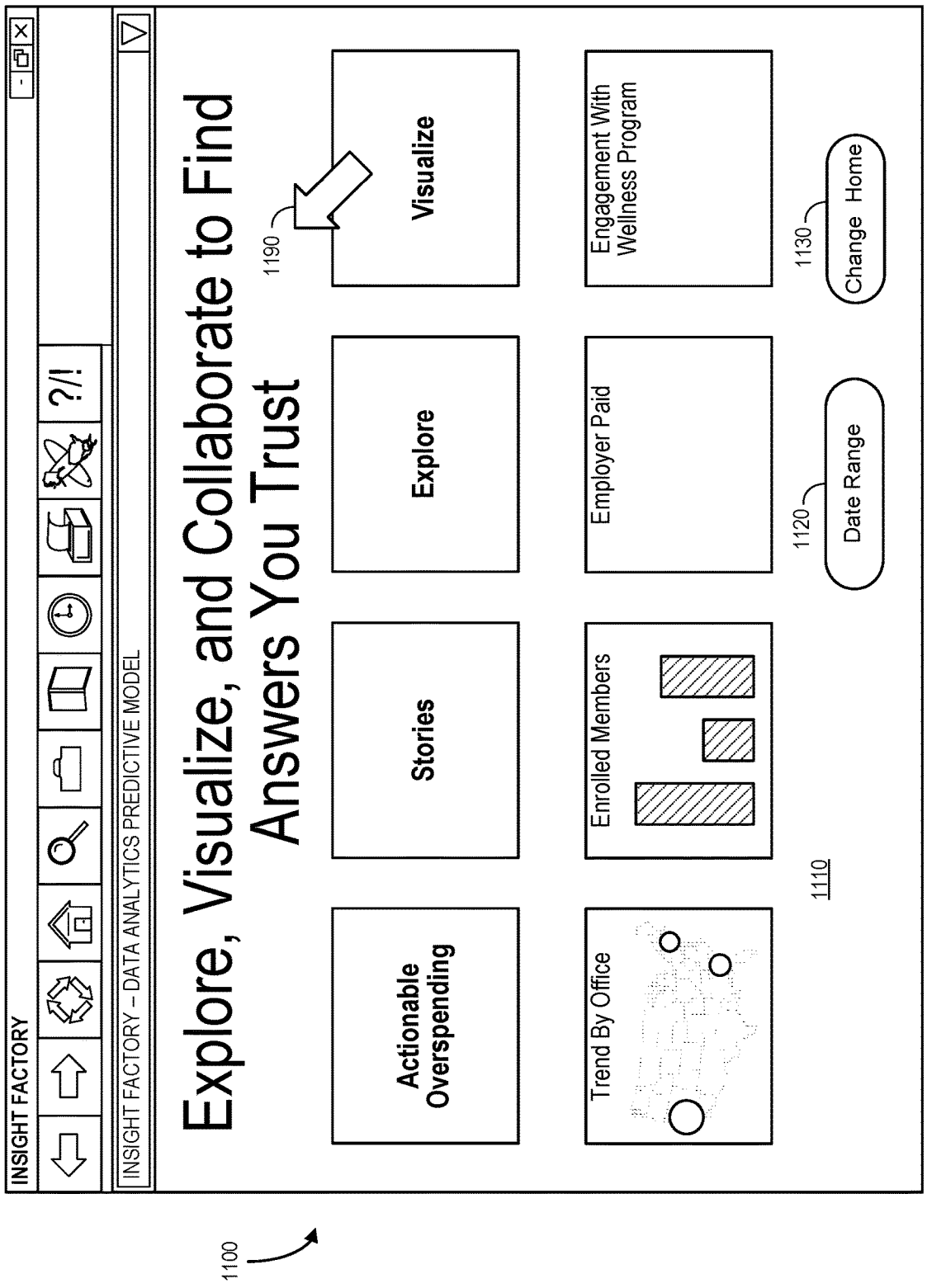
FIG. 11 is an insight platform display in accordance with some embodiments.

FIG. 11 is an insight platform display 1100 in accordance with some embodiments. The display 1100 may include graphical elements 1110 associated with, for example, actionable overspending, stories, explorations, visualization, etc. The display 1100 may allow flexible real-time queries that explore and provide a custom storyboard visualization. Embodiments may respond to queries within a few seconds to provide solution-focused reporting and actionable, client-specific stories. According to some embodiments, a "Date Range" icon 1120 may be selected to direct the query and/or a "Change Home" 1130 icon may be accessed by the user. A touchscreen or computer pointer 1190 may be used to select various elements 1110 (e.g., to adjust those elements 1110 or to view more detailed information in a pop-up window).

Figure 12:
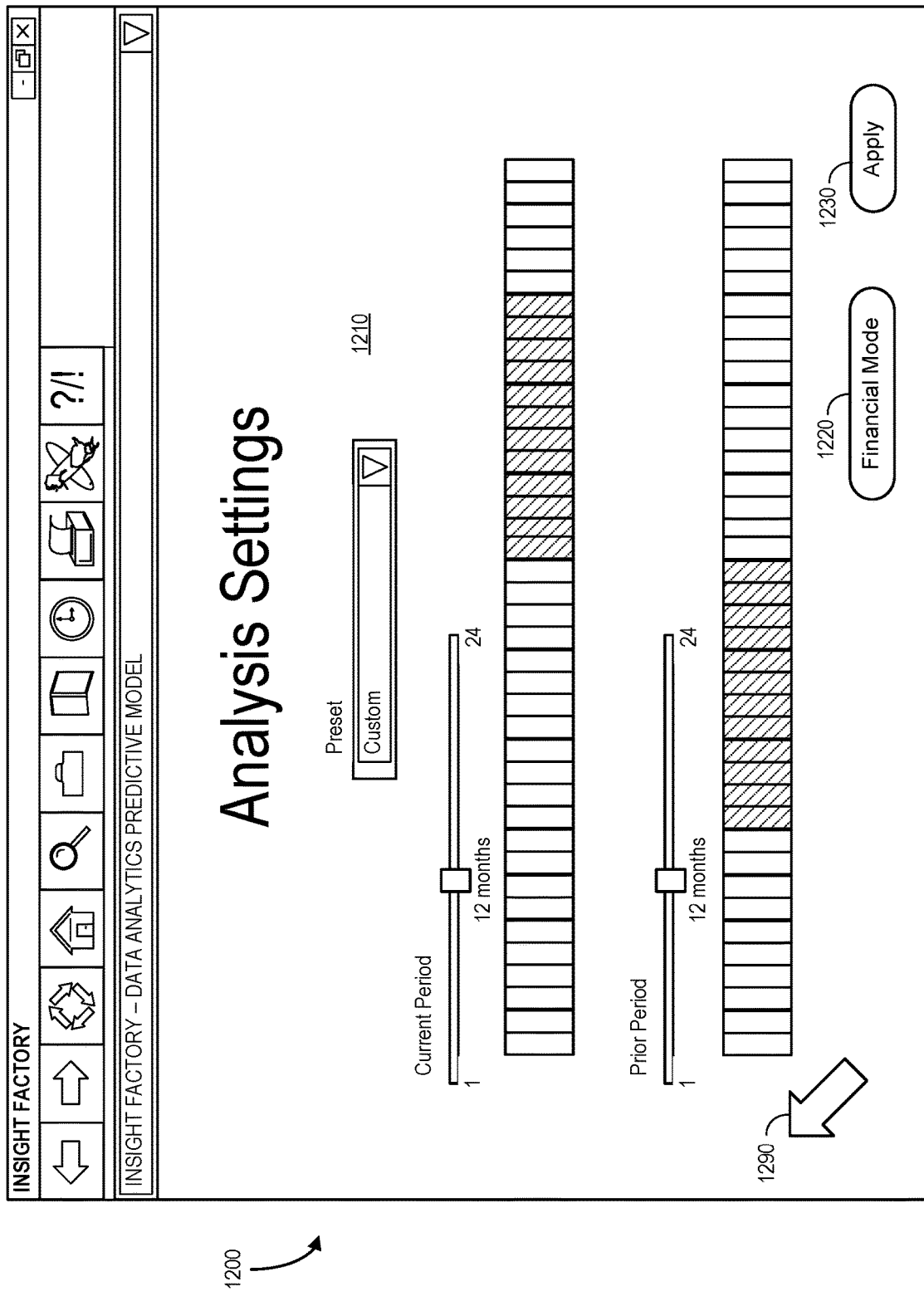
FIG. 12 is an analysis settings display according to some embodiments.

FIG. 12 is an analysis settings display 1200 according to some embodiments. The display 1200 includes graphical elements 1210 that may be used to define a current period and a prior period (e.g., to be used when comparing two periods of time). A "Financial Mode" icon 1220 may be used to toggle between "incurred" and "paid" display types. According to some embodiments, the display 1200 may further include indications of how "safe" it is for a user to rely on the data. Moreover, selection of an "Apply" icon 1230 may initiate the analysis using the defined date ranges. A touchscreen or computer pointer 1290 may be used to select various elements 1210 (e.g., to adjust those elements 1210 or to view more detailed information in a pop-up window).

Figure 13:
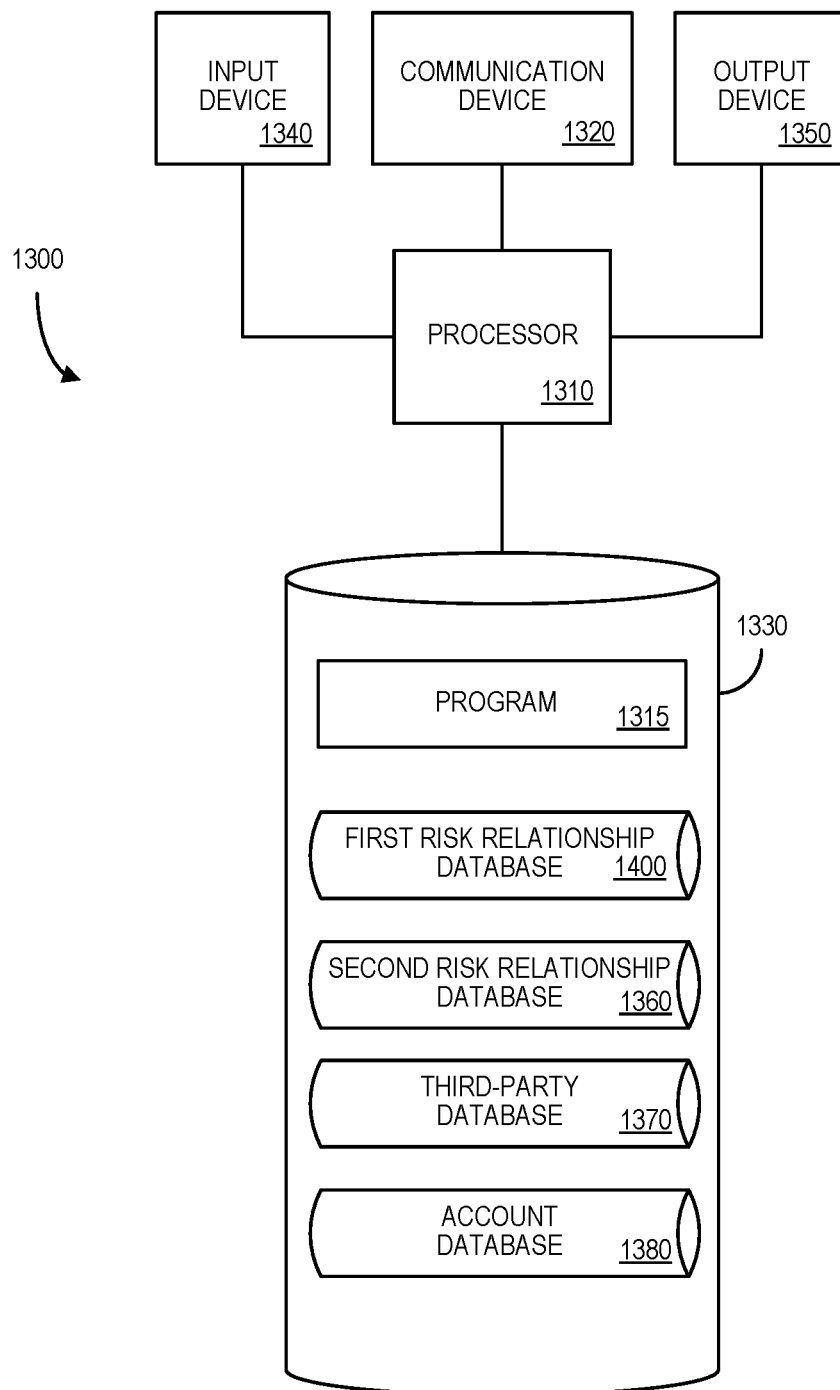
FIG. 13 is a block diagram of an apparatus in accordance with some embodiments of the present invention.

The embodiments described herein may be implemented using any number of different hardware configurations. For example, FIG. 13 illustrates an apparatus 1300 that may be, for example, associated with the systems 100, 900 described with respect to FIGS. 1 and 9, respectively. The apparatus 1300 comprises a processor 1310, such as one or more commercially available Central Processing Units ("CPUs") in the form of one-chip microprocessors, coupled to a communication device 1320 configured to communicate via a communication network (not shown in FIG. 13). The communication device 1320 may be used to communicate, for example, with one or more remote administrator computers and or communication devices (e.g., PCs and smartphones). Note that communications exchanged via the communication device 1320 may utilize security features, such as those between a public internet user and an internal network of an insurance company and/or an enterprise. The security features might be associated with, for example, web servers, firewalls, and/or PCI infrastructure. The apparatus 1300 further includes an input device 1340 (e.g., a mouse and/or keyboard to enter information about customers, etc.) and an output device 1350 (e.g., to output reports regarding risk factors, recommended changes, etc.).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1315 and/or a risk evaluation tool or application for controlling the processor 1310. The processor 1310 performs instructions of the program 1315, and thereby operates in accordance with any of the embodiments described herein. For example, the processor 1310 may analyze a set of electronic records in multiple risk relationship data stores to identify flags corresponding to risk drivers. The processor 1310 may then calculate a risk score associated with the set of electronic records based on the associated entity attribute values and the identified flags corresponding to risk drivers. The processor 1310 may also automatically generate a recommended action for an enterprise to lower the calculated risk score.

The program 1315 may be stored in a compressed, uncompiled and/or encrypted format. The program 1315 may furthermore include other program elements, such as an operating system, a database management system, and/or device drivers used by the processor 1310 to interface with peripheral devices.

As used herein, information may be "received" by or "transmitted" to, for example: (i) the apparatus 1300 from another device; or (ii) a software application or module within the apparatus 1300 from another software application, module, or any other source.

In some embodiments (such as shown in FIG. 13), the storage device 1330 further stores a first risk relationship database 1400, a second risk relationship database 1360 (e.g., associated with a different insurer), a third-party database 1370 (e.g., storing a list of medications prescribed to employees), and an account database 1380 (e.g., storing information about paid time off, etc.). An example of a database that might be used in connection with the apparatus 1300 will now be described in detail with respect to FIG. 14. Note that the database described herein is only an example, and additional and/or different information may be stored therein. Moreover, various databases might be split or combined in accordance with any of the embodiments described herein. For example, the first risk relationship database 1400 and account database 1380 might be combined and/or linked to each other within the program 1315.

Figure 14:
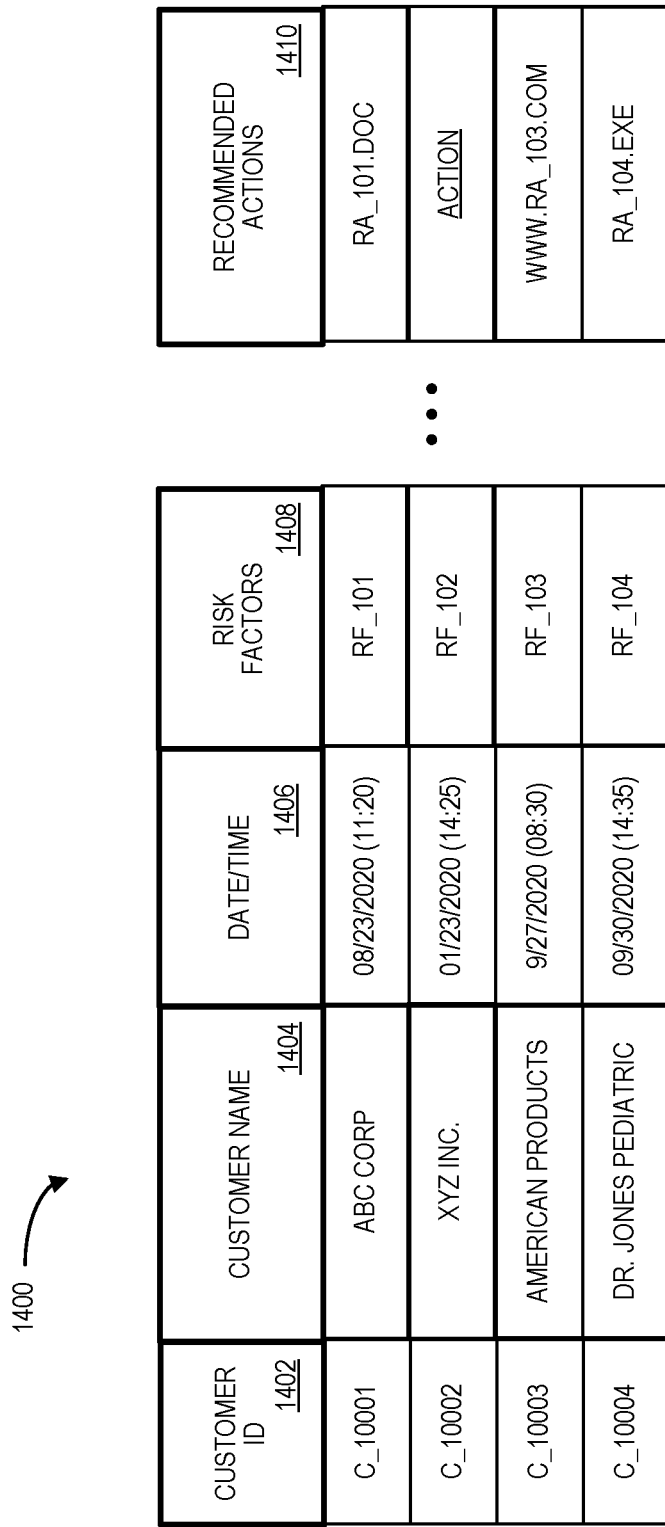
FIG. 14 is a portion of a tabular first risk relationship database according to some embodiments.

Referring to FIG. 14, a table is shown that represents the first risk relationship database 1400 that may be stored at the apparatus 1300 according to some embodiments. The table may include, for example, entries associated with insurance policies that have been sold to an enterprise. The table may also define fields 1402, 1404, 1406, 1408, 1410 for each of the entries. The fields 1402, 1404, 1406, 1408, 1410 may, according to some embodiments, specify: a customer identifier 1402, a customer name 1404, a date and time 1406, risk factors 1408, and a recommended action 1410. The first risk relationship database 1400 may be created and updated, for example, based on information electrically received from various computer systems, including those associated with an insurance company and/or an enterprise.

The customer identifier 1402 may be, for example, a unique alphanumeric code identifying a customer who has purchased an insurance policy. The customer name 1404 may be associated with the insured, and the date and time 1406 might indicate when an insurance policy was purchased. The database 1400 may store various attributes associated with the customer, such as a number of employees, income information, overtime information, etc. The risk relationship database 1400 may also store risk factors 1408 (e.g., associated with an expected cost of claims filed in connection with insurance policies). The recommended actions 1410 might comprise text, links, pointers, executable code, etc. about changes an enterprise might make to reduce risk and/or costs.

Thus, embodiments may provide an automated and efficient way of mining data (e.g., associated with various insurers, third-parties, human resource departments, etc.) to identify risk factors and for developing risk mitigation strategies in a way that provides fast and accurate results. Embodiments may also provide an ability to access and interpret data in a holistic, tactical fashion. According to some embodiments, the system may be agnostic regarding particular web browsers, sources of information, etc. For example, information from multiple sources (e.g., an internal insurance policy database and an external data store) might be blended and combined (with respect to reading and/or writing operations) so as to appear as a single "pool" of information to a user at a remote device. Moreover, embodiments may be implemented with a modular, flexible approach such that deployment of a new system for an enterprise might be possible relatively quickly. Embodiments may improve cost avoidance, improve employee wellness, reduce gaps in healthcare, lead to higher retention, smarter plan designs, and overall better health outcomes.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 15:
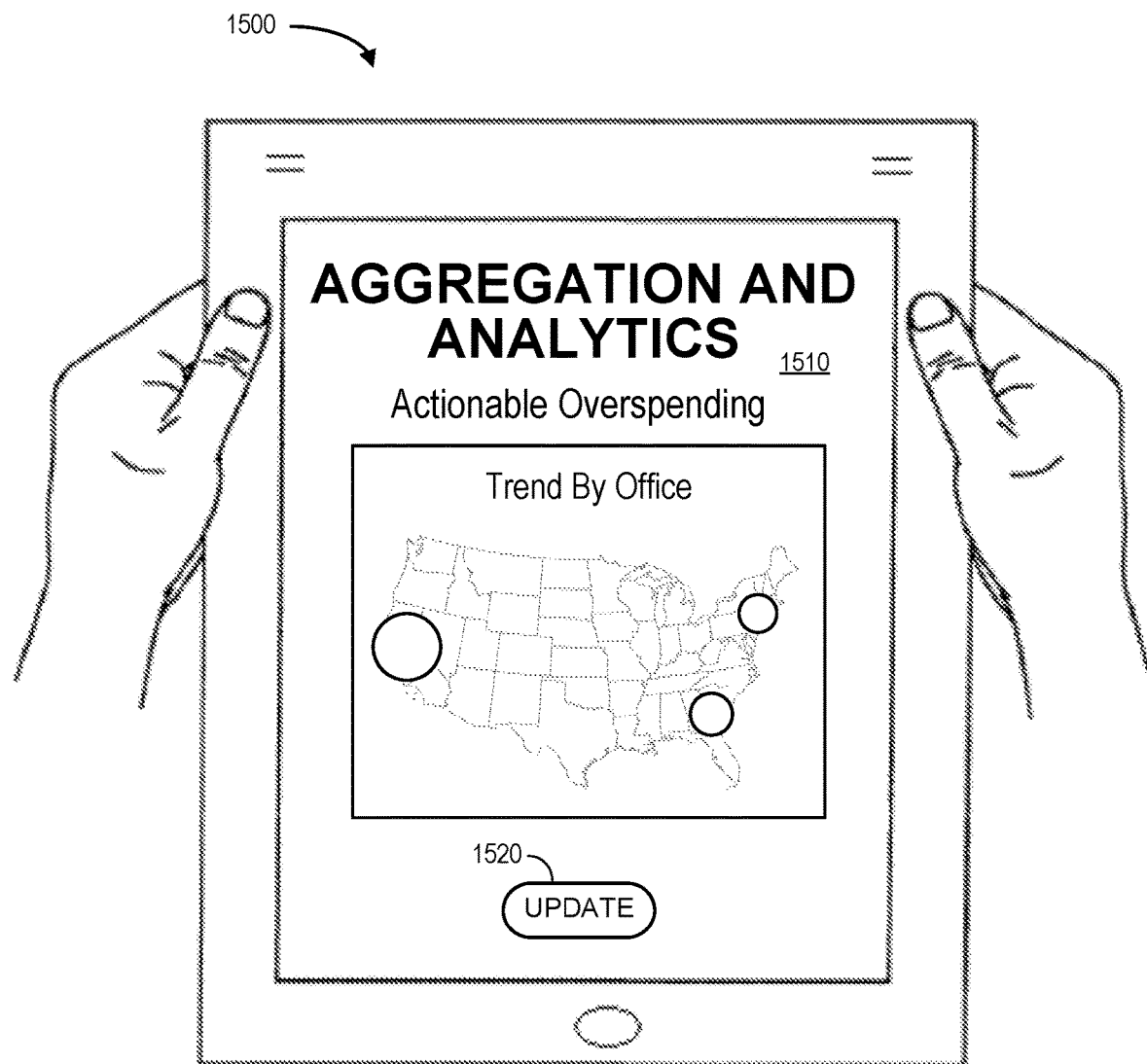
FIG. 15 illustrates a tablet computer displaying an aggregation and analytics user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in addition to and/or instead of the policies described herein (e.g., business insurance policies, automobile insurance policies, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 15 illustrates a handheld tablet computer 1500 showing an aggregation and analytics display 1510 according to some embodiments. The aggregation and analytics display 1510 might include user-selectable data that can be selected and/or modified by a user of the handheld tablet computer 1500 (e.g., via an "update" icon 1520) to view updated insurance information associated with an enterprise.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A data analytics system implemented via a back-end application computer server, comprising:
   (a) a first risk relationship data store containing electronic records that represent a plurality of risk relationships between the enterprise and a first risk relationship provider, and, for each risk relationship, an electronic record identifier and a set of entity attribute values including an entity identifier;
   (b) a second risk relationship data store containing electronic records that represent a plurality of risk relationships between the enterprise and a second risk relationship provider, and, for each risk relationship, an electronic record identifier and a set of entity attribute values including an entity identifier;
   (c) the back-end application computer server, coupled to the risk relationship data store, including:
   a computer processor, and
   a computer memory, coupled to the computer processor and storing instructions that, when executed by the computer processor, cause the back-end application computer server to:
      analyze, by a data mining engine, a set of electronic records in the first and second risk relationship data stores to identify flags corresponding to risk drivers, wherein said analyzing is performed without retrieving other electronic records, and combining the retrieved information with third-party data received from a third-party data source, to reduce a number of electronic records transmitted via a distributed communication network,
      calculate, by a predictive analytics engine, a risk score associated with the set of electronic records based on the associated entity attribute values and the identified flags corresponding to risk drivers, and
      automatically generate, by an insight platform, a recommended action for the enterprise to lower the calculated risk score;
   (d) a communication port coupled to the back-end application computer server to facilitate a transmission of data with remote user devices to support interactive user interface displays via the distributed communication network;
   (e) an email server, coupled to the back-end application computer server, to automatically establish a channel of communication with an entity linked with the entity identifier and transmit a message, including an indication that the recommended action generated by the insight platform should be implemented, via the established channel of communication; and
   (f) a workflow application, coupled to the back-end application computer server, to automatically create a reminder that the recommended action generated by the insight platform should be implemented.

2. The system of claim 1, wherein at least one of the first and second risk relationship data stores is associated with one of: (i) health insurance, (ii) prescription pharmacy insurance, (iii) workers' compensation insurance, (iv) paid family leave insurance, (v) disability insurance, (vi) short term disability insurance, (vii) long term disability insurance, (viii) paid time off, (ix) sick leave, (x) employee sentiment, (xi) human resources data, and (xii) wearable Internet of Things ("IoT") sensors.

3. The system of claim 1, wherein the automatically generated recommendation is associated with at least one of: (i) insurance pricing, (ii) a deductible, (iii) a limit, (iv) an insurance plan design, (v) insurance claim management, (vi) a service, (vii) a prevention strategy, and (viii) a recovery strategy.

4. The system of claim 1, wherein the predictive analytics engine implements a predictive model to calculate the likelihood of certain events occurring on the basis of risk drivers identified for each of the plurality of electronic records; and
   wherein the risk score is based on the calculated likelihood of certain events occurring.

5. The system of claim 1, wherein the insight platform accesses a database of insurance claim records, each insurance claim record including associated risk score and claim outcome; and
   wherein the insight platform determines an expected claim outcome for the calculated risk score by analyzing the claim outcomes of insurance claim records having risk scores that are substantially the same as the calculated risk score.

6. The system of claim 1, wherein the insight platform automatically generates an electronic message requesting confirmation that the recommended action has been implemented.

7. The system of claim 1, wherein the insight platform generates an insurance claim record corresponding to each of the plurality of electronic records, each insurance claim record including an associated risk score and an expected claim outcome.

8. A computerized data analytics method implemented via a back-end application computer server, comprising:
   analyzing, by a computer processor executing a data mining engine of the back-end application computer server, a set of electronic records in a first and a second risk relationship data store to identify flags corresponding to risk drivers, wherein the first risk relationship data store contains electronic records that represent a plurality of risk relationships between the enterprise and a first risk relationship provider, and the second risk relationship data store contains electronic records that represent a plurality of risk relationships between the enterprise and a second risk relationship provider, wherein said analyzing is performed without retrieving other electronic records, and combining the set of electronic records with third-party data received from a third-party data source, to reduce a number of electronic records transmitted via a distributed communication network;
   calculating, by a predictive analytics engine of the back-end application computer server, a risk score associated with the set of electronic records based on associated entity attribute values and the identified flags corresponding to risk drivers;

automatically generating, by an insight platform of the back-end application computer server, a recommended action for the enterprise to lower the calculated risk scores;

automatically establishing, by an email server coupled to the back-end application computer server, a channel of communication with an entity linked with the entity identifier and transmitting a message, including an indication that the recommended action generated by the insight platform should be implemented, via the established channel of communication; and automatically creating, by a work flow application coupled to the back-end application computer server, a reminder that the recommended action generated by the insight platform should be implemented.

9. The method of claim 8, wherein at least one of the first and second risk relationship data stores is associated with one of: (i) health insurance, (ii) prescription pharmacy insurance, (iii) workers' compensation insurance, (iv) paid family leave insurance, (v) disability insurance, (vi) short term disability insurance, (vii) long term disability insurance, (viii) paid time off, (ix) sick leave, (x) employee sentiment, (xi) human resources data, and (xii) wearable Internet of Things ("IoT") sensors.

10. The method of claim 8, wherein the automatically generated recommendation is associated with at least one of: (i) insurance pricing, (ii) a deductible, (iii) a limit, (iv) an insurance plan design, (v) insurance claim management, (vi) a service, (vii) a prevention strategy, and (viii) a recovery strategy.

11. The method of claim 8, wherein the predictive analytics engine implements a predictive model to calculate the likelihood of certain events occurring on the basis of risk drivers identified for each of the plurality of electronic records; and wherein the risk score is based on the calculated likelihood of certain events occurring.

12. The method of claim 8, wherein the insight platform accesses a database of insurance claim records, each insurance claim record including associated risk score and claim outcome; and wherein the insight platform determines an expected claim outcome for the calculated risk score by analyzing the claim outcomes of insurance claim records having risk scores that are substantially the same as the calculated risk score.

13. The method of claim 8, wherein the insight platform automatically generates an electronic message requesting confirmation that the recommended action has been implemented.

14. The method of claim 8, wherein the insight platform generates an insurance claim record corresponding to each of the plurality of electronic records, each insurance claim record including an associated risk score and an expected claim outcome.

15. A non-tangible, computer-readable medium storing instructions, that, when executed by a processor, cause the processor to perform a data analytics method implemented via a back-end application computer server, the method comprising:

analyzing, by a computer processor executing a data mining engine of the back-end application computer server, a set of electronic records in a first and a second risk relationship data store to identify flags corresponding to risk drivers, wherein the first risk relationship data store contains electronic records that represent a plurality of risk relationships between the enterprise and a first risk relationship provider, and the second risk relationship data store contains electronic records that represent a plurality of risk relationships between the enterprise and a second risk relationship provider, wherein said analyzing is performed without retrieving other electronic records, and combining the set of electronic records with third-party data received from a third-party data source, to reduce a number of electronic records transmitted via a distributed communication network;

calculating, by a predictive analytics engine of the back-end application computer server, a risk score associated with the set of electronic records based on associated entity attribute values and the identified flags corresponding to risk drivers;

automatically generating, by an insight platform of the back-end application computer server, a recommended action for the enterprise to lower the calculated risk score;

automatically establishing, by an email server coupled to the back-end application computer server, a channel of communication with an entity linked with the entity identifier and transmitting a message, including an indication that the recommended action generated by the insight platform should be implemented, via the established channel of communication; and automatically creating, by a work flow application coupled to the back-end application computer server, a reminder that the recommended action generated by the insight platform should be implemented.

16. The medium of claim 15, wherein at least one of the first and second risk relationship data stores is associated with one of: (i) health insurance, (ii) prescription pharmacy insurance, (iii) workers' compensation insurance, (iv) paid family leave insurance, (v) disability insurance, (vi) short term disability insurance, (vii) long term disability insurance, (viii) paid time off, (ix) sick leave, (x) employee sentiment, (xi) human resources data, and (xii) wearable Internet of Things ("IoT") sensors.

17. The medium of claim 15, wherein the automatically generated recommendation is associated with at least one of: (i) insurance pricing, (ii) a deductible, (iii) a limit, (iv) an insurance plan design, (v) insurance claim management, (vi) a service, (vii) a prevention strategy, and (viii) a recovery strategy.

18. The medium of claim 15, wherein the predictive analytics engine implements a predictive model to calculate the likelihood of certain events occurring on the basis of risk drivers identified for each of the plurality of electronic records; and wherein the risk score is based on the calculated likelihood of certain events occurring.

19. The medium of claim 15, wherein the insight platform accesses a database of insurance claim records, each insurance claim record including associated risk score and claim outcome; and wherein the insight platform determines an expected claim outcome for the calculated risk score by analyzing the claim outcomes of insurance claim records having risk scores that are substantially the same as the calculated risk score.

20. The medium of claim 15, wherein the insight platform automatically generates an electronic message requesting confirmation that the recommended action has been implemented.

21. The medium of claim 15, wherein the insight platform generates an insurance claim record corresponding to each of the plurality of electronic records, each insurance claim record including an associated risk score and an expected claim outcome.

\* \* \* \* \*